US008367273B2

(12) United States Patent
Lust et al.

(10) Patent No.: US 8,367,273 B2
(45) Date of Patent: Feb. 5, 2013

(54) METHOD FOR PREPARATION OF THE SOLID OXIDE FUEL CELL SINGLE CELL

(75) Inventors: Enn Lust, Tartu (EE); Gunnar Nurk, Tartu (EE); Priit Möller, Tartu (EE); Indrek Kivi, Tartu (EE); Silvar Kallip, Tartu (EE); Alar Jänes, Puhja vald (EE); Helsi Kurig, Palupera Vald (EE)

(73) Assignee: Elcogen AS (EE)

( * ) Notice: Subject to any disclaimer, the term of this patent is extended or adjusted under 35 U.S.C. 154(b) by 490 days.

(21) Appl. No.: 12/602,391

(22) PCT Filed: May 31, 2007

(86) PCT No.: PCT/EE2007/000010
§ 371 (c)(1),
(2), (4) Date: May 28, 2010

(87) PCT Pub. No.: WO2008/145145
PCT Pub. Date: Dec. 4, 2008

(65) Prior Publication Data
US 2010/0239959 A1 Sep. 23, 2010

(51) Int. Cl.
*H01M 8/02* (2006.01)
*H01M 4/88* (2006.01)
(52) U.S. Cl. ......... 429/535; 429/495; 429/488; 429/489
(58) Field of Classification Search .................. 429/535, 429/482–489, 491, 495
See application file for complete search history.

(56) References Cited

U.S. PATENT DOCUMENTS

| | | | | |
|---|---|---|---|---|
| 5,021,304 A | * | 6/1991 | Ruka et al. ............... | 429/485 |
| 5,306,411 A | * | 4/1994 | Mazanec et al. .......... | 204/265 |
| 6,645,656 B1 | * | 11/2003 | Chen et al. ............... | 429/485 |
| 7,566,388 B2 | * | 7/2009 | Sasaki et al. ............. | 204/283 |
| 2003/0027033 A1 | * | 2/2003 | Seabaugh et al. ........ | 429/40 |
| 2008/0193803 A1 | * | 8/2008 | Sholklapper et al. ..... | 429/12 |

OTHER PUBLICATIONS

Electrochemical characteristics of Ce0.8Gd0.2O1.9|La0.6Sr0.4CoO3-d + Ce0.8Gd0.2O1.9 half-cell; Enn Lust Æ Gunnar Nurk Æ Silvar Kallip Æ Indrek Kivi Priit Möller;J Solid State Electrochem (2005) 9: 674-683.*
Optimization of the Cathode Composition for the Intermediate-Temperature SOFC; Enn Lust, Priit Möller, Indrek Kivi, Gunnar Nurk, Silvar Kallip, Priit Nigu, and Karmen Lust; J. Electrochem. Soc. 2005, vol. 152, Issue 12, pp. A2306-A2308.*

* cited by examiner

*Primary Examiner* — Keith Walker
(74) *Attorney, Agent, or Firm* — Reed Smith LLP

(57) ABSTRACT

There are disclosed a method for preparation of the solid oxide fuel cell single cell and a single cell with nano (micro) meso porous cathode electrode that are operational from 723 to 1073 K. The cathode electrode of the single cell possesses very large surface area (10-500 m2 g$^{-1}$) with the hierarchical nano (micro) mesoporous structure, very high catalytic activity and very low oxygen electroreduction activation energy varying from 0.3-0.8 eV at −0.2 . . . 0 V cathode electrode potential versus porous Pt/O$_2$ reference electrode in air.

10 Claims, 34 Drawing Sheets

METHOD FOR PREPARATION OF THE SOLID OXIDE FUEL CELL SINGLE CELL

RELATED APPLICATION

This application is a 371 National Stage of International Application No. PCT/EE2007/000010, filed May 31, 2007. The aforementioned patent application is expressly incorporated herein by reference in its entirety.

FIELD OF THE INVENTION

This invention relates to high temperature fuel cell having mixed conducting cathode electrodes, in particular solid oxide fuel cells and, more particularly, to solid oxide fuel cell cathode electrodes. More particularly yet, this invention relates to a method for preparation of the solid oxide fuel cell single cell and nano(micro)mesoporous cathode electrode with enhanced specific surface area.

BACKGROUND OF THE INVENTION

Fuel cells are the modern electrochemical devices that convert the chemical energy of a fuel into electric energy and heat energy with high efficiency [S. C. Singhal, Solid State Ionics 135, 305-313 (2000); A. Weber, E. Ivers-Tiffée, J. Power Sources 127, 273-283 (2004); E. Lust, P. Möller, I. Kivi, G. Nurk, S. Kallip, P. Nigu, K. Lust, J. Electrochem. Soc. 152 (2005) A 2306; O. Yamamoto, Electrochim. Acta 45 (2000) 2423]. The basic structure of a fuel cell consists of the porous cathode (oxygen reduction process) and porous anode (oxidation—fuel burning process) and a compact electrolyte layer between cathode and anode. In a typical fuel cell, fuels in a gaseous phase, typically hydrogen, methane etc. are continuously fed to the anode electrode compartment and an oxidant typically oxygen from air (or pure oxygen) is continuously fed to the cathode electrode compartment [S. C. Singhal, Solid State Ionics 135, 305-313 (2000); A. Weber, E. Ivers-Tiffée, J. Power Sources 127, 273-283 (2004); E. Lust, P. Möller, I. Kivi, G. Nurk, S. Kallip, P. Nigu, K. Lust, J. Electrochem. Soc. 152 (2005) A 2306]. The electrochemical oxidation and reduction reactions take place at or inside the porous structure of electrodes to produce an electric current and residual heat because the exothermic fuel oxidation reaction takes place as well as clean water vapour as a final chemical product forms.

In a solid oxide fuel cell the electrolyte is a nonporous compact mixed metal oxide, traditionally $Y_2O_3$-stabilized $ZrO_2$ (YSZ) for so-called high-temperature solid oxide fuel cells (working temperature T>1073 K) and $Sm_2O_3$-stabilized $CeO_2$ (CSO) or $Gd_2O_3$-stabilized $CeO_2$ (CGO), for the so-called intermediate temperature (773<T<973 K) solid oxide fuel cells. For high-temperature solid oxide fuel cells the cathode is typically Sr-doped $LaMnO_3$, but for intermediate-temperature solid oxide fuel cell the cathode is typically Sr-doped $LaCoFeO_3$ or Sr-doped $LaCoO_3$, where the mixed conduction process of the oxygen ion occurs. The anode electrode is the metal (Ni or Cu)/YSZ cermet for the high-temperature solid oxide fuel cell (973<T<1273 K) and Ni/CSO cermet for the intermediate temperature solid oxide fuel cell (773<T<973 K) [S. C. Singhal, Solid State Ionics 135, 305-313 (2000); A. Weber, E. Ivers-Tiffée, J. Power Sources 127, 273-283 (2004); E. Lust, P. Möller, I. Kivi, G. Nurk, S. Kallip, P. Nigu, K. Lust, J. Electrochem. Soc. 152 (2005) A 2306; O. Yamamoto, Electrochim. Acta 45 (2000) 2423].

The most commonly used solid oxide fuel cell cathode material is mixed-conducting $La_{1-x}Sr_xMnO_3$ (Sr-doped $LaMnO_3$) oxide, where x denotes the molar ratio of strontium added into $LaMnO_3$. However, the rate of electroreduction of oxygen from air is a very slow process and one possibility to increase the catalytic activity is to use the electrochemically more active $La_{1-x}Sr_xCoO_{3-\delta}$ or $La_{1-x}Sr_xCo_{1-y}Fe_yO_{3-\delta}$ cathodes, where y is the molar ratio of $Fe^{3+}$ ions added into $LaSrCoO_3$ [S. C. Singhal, Solid State Ionics 135, 305-313 (2000); A. Weber, E. Ivers-Tiffée, J. Power Sources 127, 273-283 (2004); E. Lust, P. Möller, I. Kivi, G. Nurk, S. Kallip, P. Nigu, K. Lust, J. Electrochem. Soc. 152 (2005) A 2306; O. Yamamoto, Electrochim. Acta 45 (2000) 2423; V. Dusastre, A. Kilner, Solid State Ionics 126, 163-174 (1999); A. Esquirol, N. P. Brandon, J. A. Kilner, M. Mogensen, J. Electrochem. Soc. 151, A1847-A1855 (2004)]. Another possibility is to increase the reaction volume (reaction area) through nano(micro)mesoporous structure of the cathode electrode layer. The nanopores are pores with width lower than two nanometers, named according to IUPAC classification as micropores.

SUMMARY OF THE INVENTION

There is disclosed a method for preparation of the solid oxide fuel cell single cell with nano(micro)meso porous cathode electrode working effectively from 723 to 1073 K.

The method for preparation of the solid oxide fuel cell single cell comprises the following steps:

(A) thermal decomposition of mixture of rare earth nitrate, strontium nitrate and cobalt nitrate to the mixed conducting corresponding rare earth cobaltite activated with strontium ions (molar ratio of $Sr^{2+}$ from 0 to 0.6) in the presence of the reducing agent (e.g. glycine) and oxygen;

(B) preparation of the raw cathode paste by mixing rare earth cobaltite activated with strontium ions, mechanically uncompressible pore forming agent (e.g. carbon acetylene black powder with surface area 80 $m^2$ $g^{-1}$ in amount up to 30 weight percent of the total raw paste), organic binder (e.g. ethylcellulose in amount up to 10 weight percent of the total raw paste) and solvent (e.g. turpentine oil) as nano(micro)mesopores forming agents for obtaining highly nano(micro)mesoporous cathode electrode;

(C) preparation of gadolinia ($Gd_2O_3$) and samaria ($Sm_2O_3$) doped ceria electrolyte at sintering temperature from 800 to 1800 K with the molar ratio of gadolinia or samaria in gadolinia or samaria activated ceria is varied from 0 to 0.20, before sintering pressed at pressure from 5 to 20 kN $cm^{-2}$ during from 0.5 to 15 min;

(D) preparation of nano(micro)mesoporous cathode electrode and nano(micro)mesoporous cathode-electrolyte halfcell by burning out the pore forming agent, solvent and binder from the raw cathode electrode paste and sintering it onto the gadolinia or samaria doped ceria oxide oxygen ion conducting electrolyte at temperatures from 500 to 1673 K during 60-600 min;

(E) completing solid oxide fuel cell single cell by screen-printing Pt-paste onto the cathode-electrolyte halfcell and sintering the fuel cell at temperatures from 800 to 1400 K during 6-600 min.

The molar ratio of rare earth element (e.g. lanthanum, praseodymium and gadolinium) in strontium activated rare earth cobaltite is varied from 1 to 0.4 in the A-site position of perovskite structure of rare earth cobaltite activated with strontium ions.

The solid oxide fuel cell single cell works effectively from 723 to 1073 K and comprises highly nano(micro)mesoporous cathode electrode, anode electrode and electrolyte. The nano(micro)mesoporous cathode possesses very large surface area (10-500 m$^2$ g$^{-1}$) with the hierarchical nano(micro)mesoporous structure. The cathode is characterized by very high catalytic activity and thus having very low oxygen electroreduction activation energy varing from 0.3-0.8 eV at cathode electrode potential from −0.2 to 0 V versus porous Pt|O$_2$ reference electrode in air.

The medium-temperature solid oxide fuel cell cathode, prepared according to the above described method, comprises a micro nano(micro)mesoporous mixed conducting $La_{1-x}Sr_xCoO_3$, $Pr_{1-x}Sr_xCoO_3$, $Gd_{1-x}Sr_xCoO_3$, structure produced by the thermal decomposition of the pore forming agents during initial cathode preparation cycle carried out at a temperature less than or equal to about 1500 K.

BRIEF DESCRIPTION OF THE DRAWINGS

The features of this invention will be better understood from the following description taken in conjugation with the drawings given in Figures wherein:

FIGS. 7 and 8 correspond to 1.36 weight %, FIG. 9 to 2.66 wt % and FIG. 10 to 5.24 wt % of carbon acetylene black powder addition into the unsintered raw cathode material;

FIGS. 14 and 17 for $La_{0.6}Sr_{0.4}CoO_{3-\delta}$, FIG. 15 for $Pr_{0.6}Sr_{0.4}CoO_{3-\delta}$ and FIG. 16 for $Gd_{0.6}Sr_{0.4}CoO_{3-\delta}$ at T=1423 K (FIGS. 14, 15 and 16) and at T=1073 K (FIG. 17);

DETAILED DESCRIPTION OF THE PRESENTLY PREFERRED EMBODIMENTS

The invention disclosed herein is a method for preparation of the solid oxide fuel cell single cell with nano(micro)meso porous cathode electrode working effectively from 723 to 1073 K.

The invention works out the synthesis conditions of the nano-powder for $La_{1-x}Sr_xCoO_{3-\delta}$, $Pr_{1-x}Sr_xCoO_{3-\delta}$, and $Gd_{1-x}Sr_xCoO_{3-\delta}$ cathode electrode with the nano (micro) size particles by the solution phase synthesis method from corresponding $La(NO_3)_3.6H_2O$, $Pr(NO_3)_3.6H_2O$, $Gd(NO_3)_3.6H_2OSr(NO_3)_2$ and $Co(NO_3)_3.6H_2O$ nitrates. The corresponding nitrates were dissolved in H$_2$O, where the known amount of a reducing agent glycine was added and dissolved before. Thereafter the mixture was heated to 353 K during from 0.5 to 3 hours to form a viscous solution of colloidal system. The hot solution was added drop wise to a Pt-beaker that was preheated between 573 and 673 K. Water was quickly evaporated from solution and the resulting viscous liquid swelled, auto-ignited and initiated a highly exothermic self-continued combustion process, converting the precursor materials into the powder of the complex oxides. The evolution of gases during the combustion process helped in formation of fine ceramic nano(micro)powder containing some carbon residue. The powder was further calcined to convert to the desired product. Thereafter the powder was heat-treated in air at various temperatures between 700 and 1300 K during from 0.5 to 2 hours to form the crystalline phase with different crystallinities.

The received nano-powder of $La_{1-x}Sr_xCoO_{3-\delta}$, $Pr_{1-x}Sr_xCoO_{3-\delta}$, or $Gd_{1-x}Sr_xCoO_{3-\delta}$ was mixed with the pores forming agent (carbon acetylene black powder) with medium diameter from 100 nm to 10 μm. After adding the complex formation agent (ethylcellulose) and solvent (turpentine oil) the viscous paste was prepared using mechanical rotator.

The received raw cathode paste has been screen-printed onto the said as prepared $Gd_{1-x}Ce_xO_{2-\delta}$ electrolyte tablet and thereafter sintered at fixed different temperatures from 800 to 1500 K during from 0.5 to 12 hours. The heating up temperature was usually 20 K min$^{-1}$.

After cooling down the ready for testing $Gd_{1-x}Ce_xO_{2-\delta}$ electrolyte|nano(micro)mesoporous rare earth cobaltites activated with $Sr^{2+}$ cathode electrode was covered with Pt paste to guarantee good electrical conductivity between, as prepared by solution (nitrate) based method $La_{1-x}Sr_xCoO_{3-\delta}$, $Pr_{1-x}Sr_xCoO_{3-\delta}$ or $Gd_{1-x}Sr_xCoO_{3-\delta}$ cathode electrode surface and current collector (Pt mesh).

Figure 20:
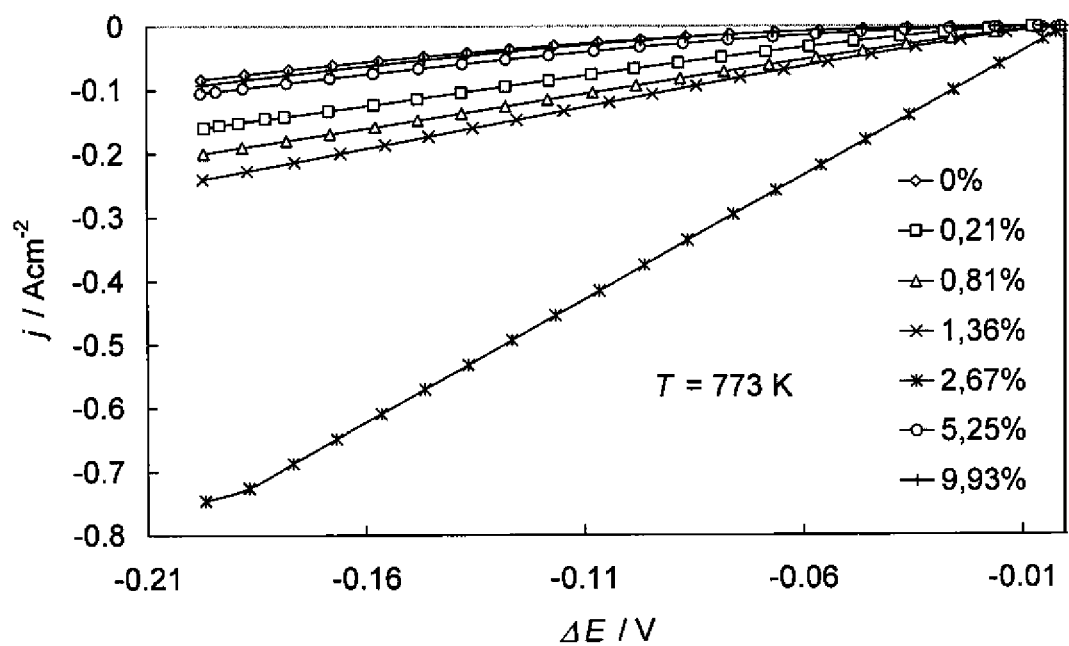
FIGS. 20, 21 and 22 show the cyclic voltammograms (current density vs. cathode potential plots) for nano(micro)mesoporous $La_{0.6}Sr_{0.4}CoO_{3-\delta}$ cathode electrode|$Ce_{0.9}Gd_{0.1}O_{1.95}$|porous Pt anode electrode single cell. $La_{0.6}Sr_{0.4}CoO_{3-\delta}$ cathode electrode was prepared at sintering temperature T=1423 K.
Figure 21:
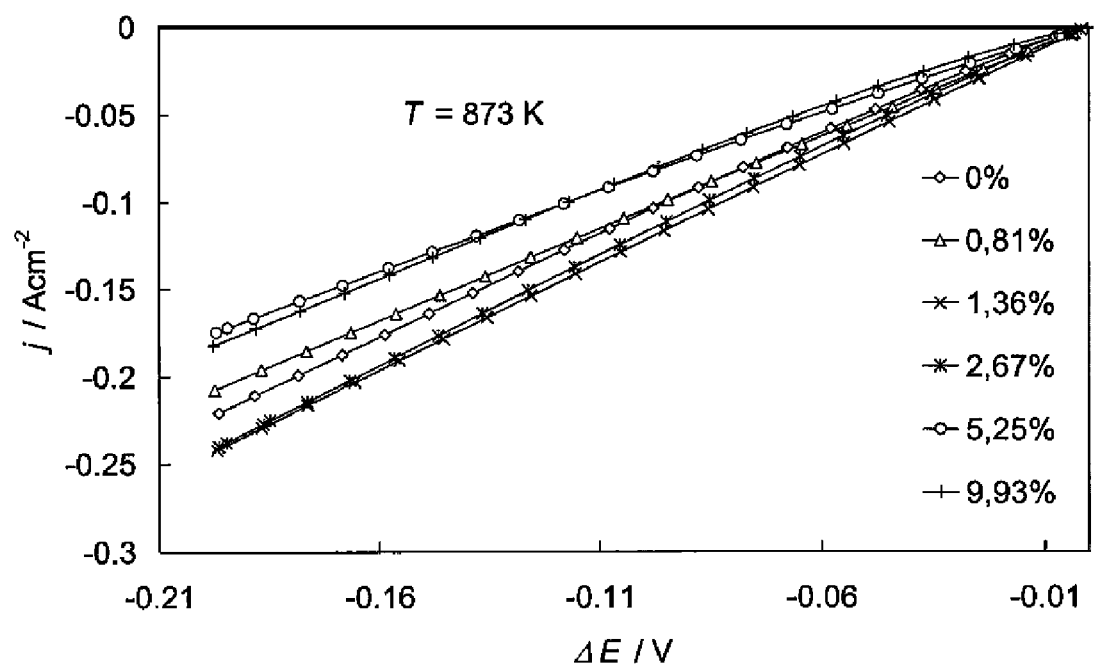
Figure 22:
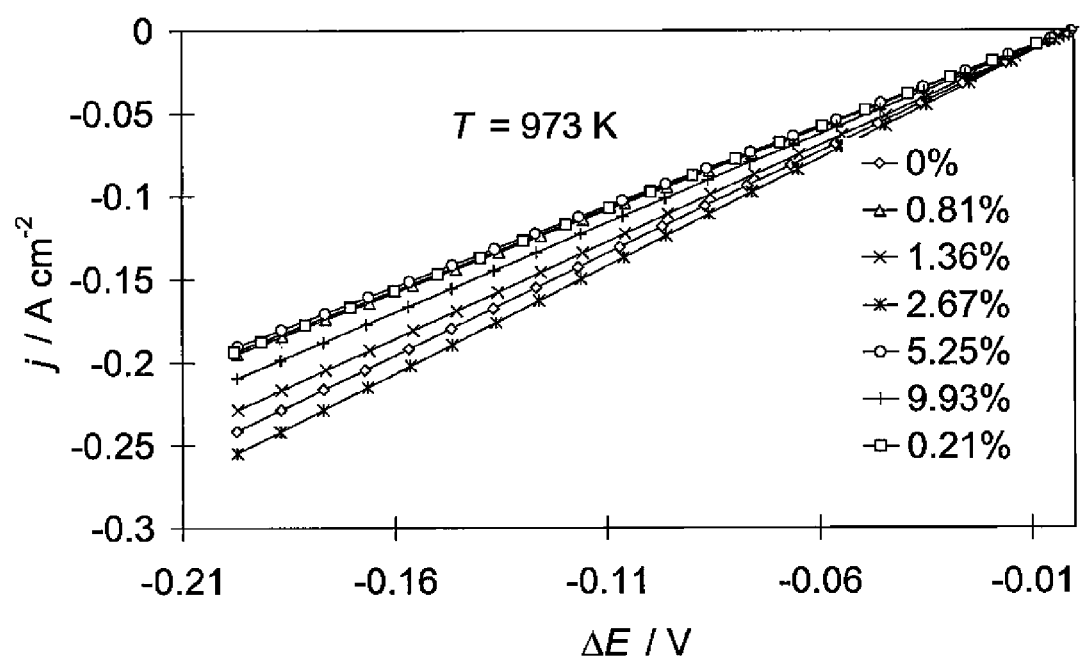
Figure 23:
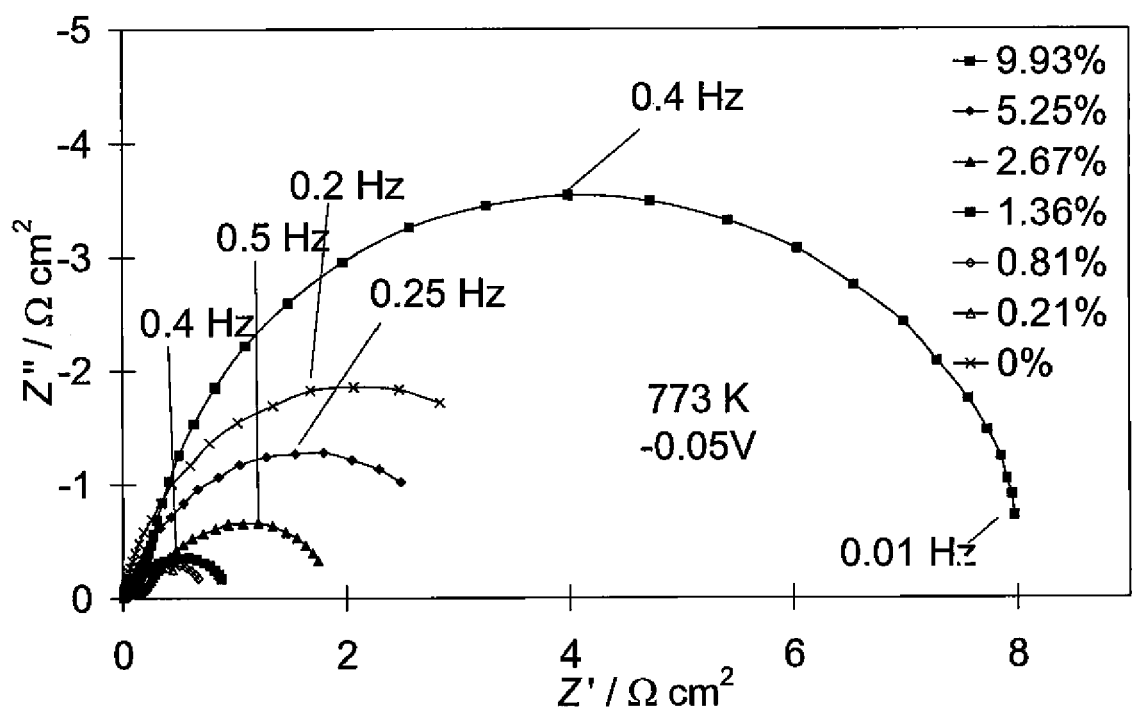
FIGS. 23, 24, 25, 26, 27 and 28 show the complex impedance plane plots for nano(miro)meso-porous $La_{0.6}Sr_{0.4}CoO_{3-\delta}$ cathode electrode|$Ce_{0.9}Gd_{0.1}O_{1.95}$|porous Pt anode electrode single cell at temperatures and cathode potentials, given in figures.
Figure 24:
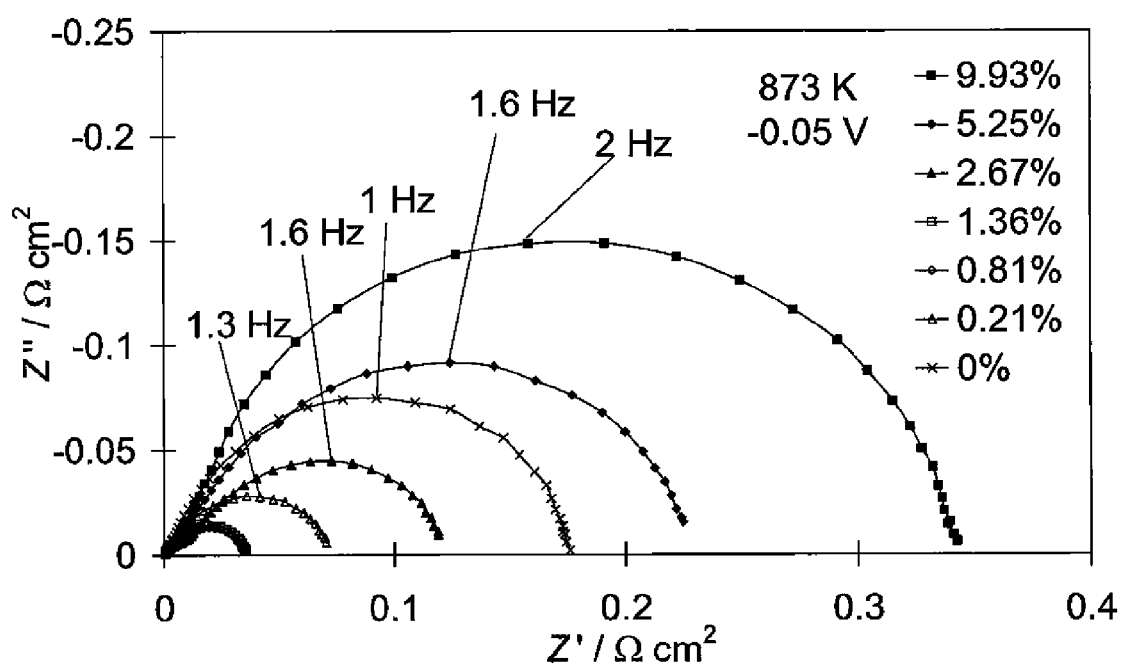
Figure 25:
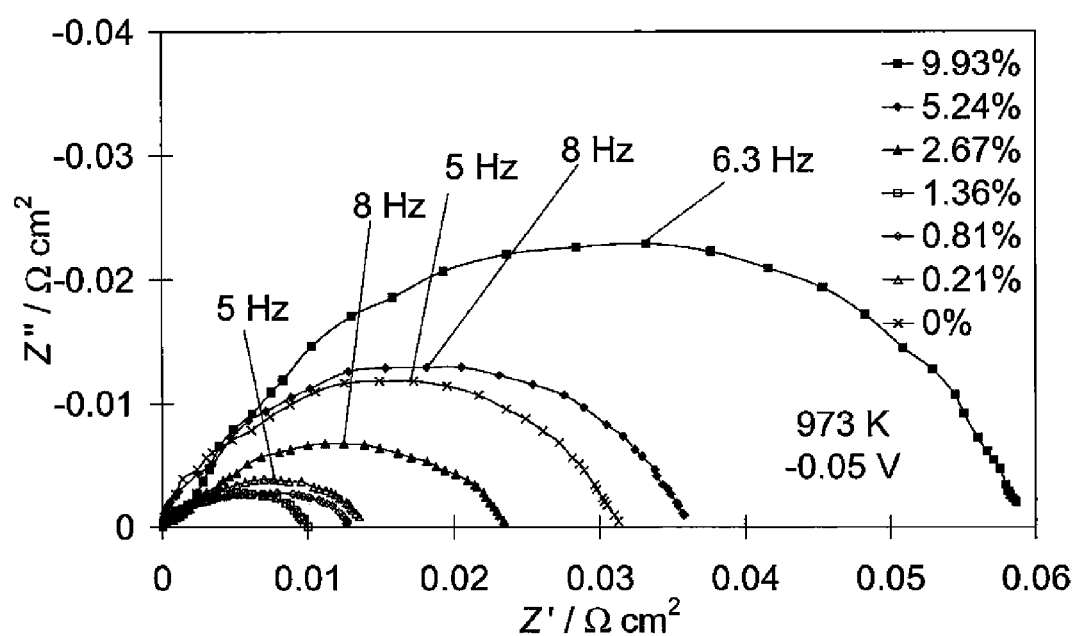
Figure 26:
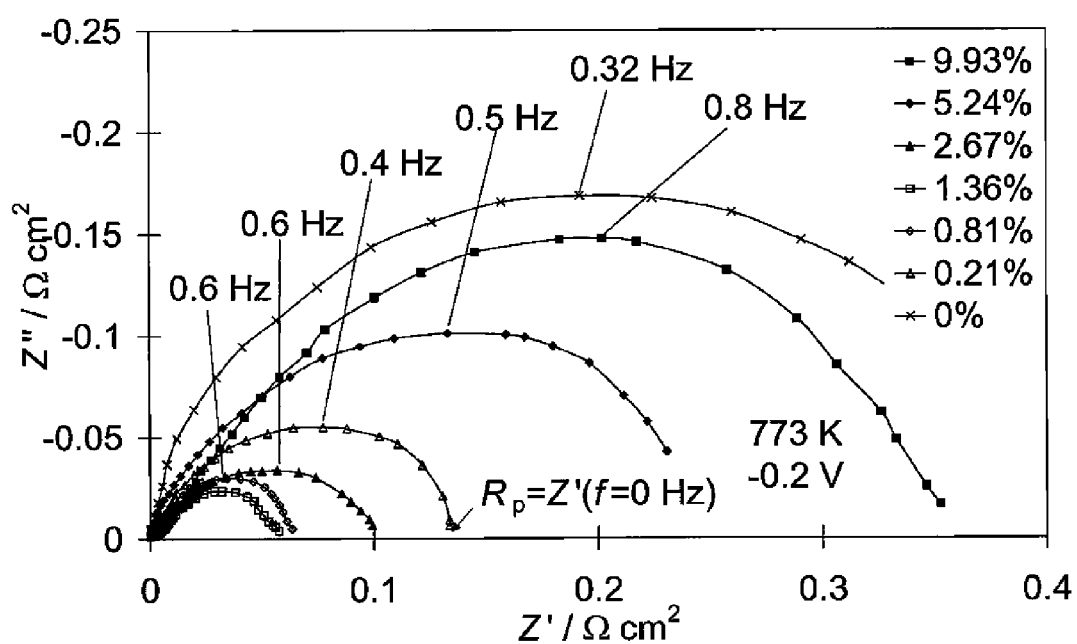
Figure 27:
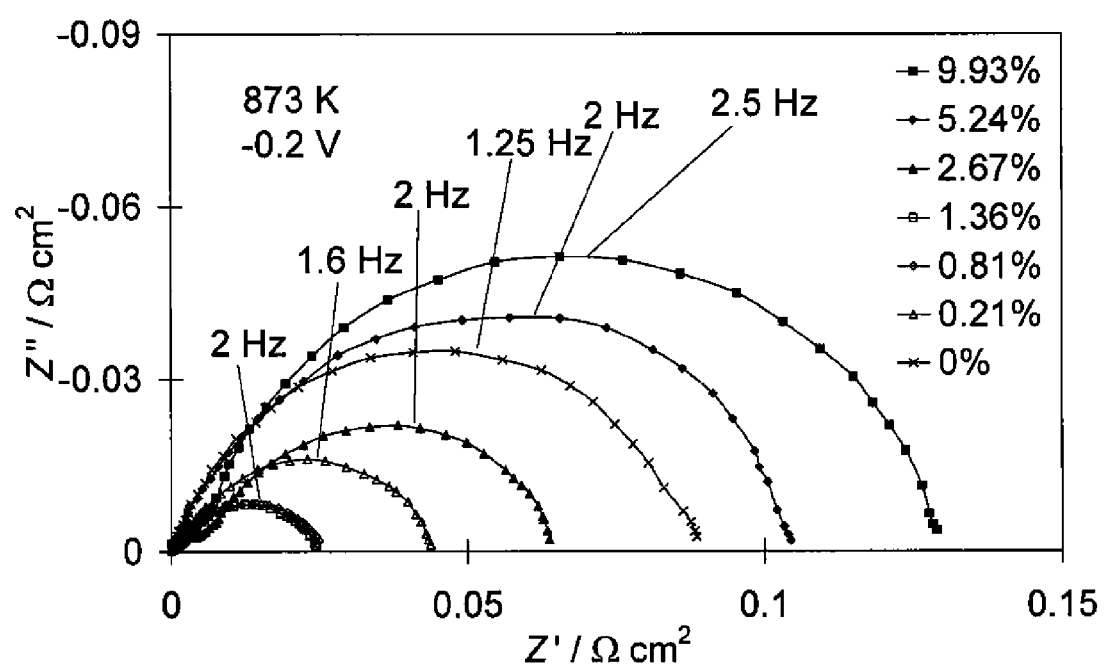
Figure 28:
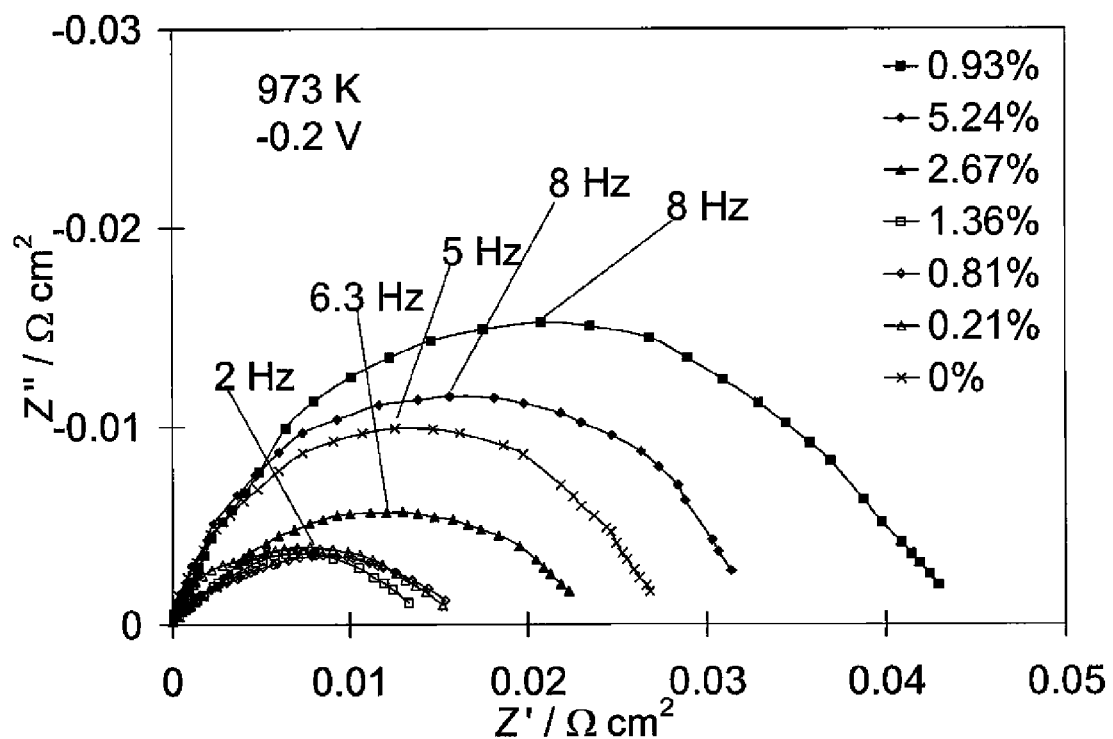
Figure 29:
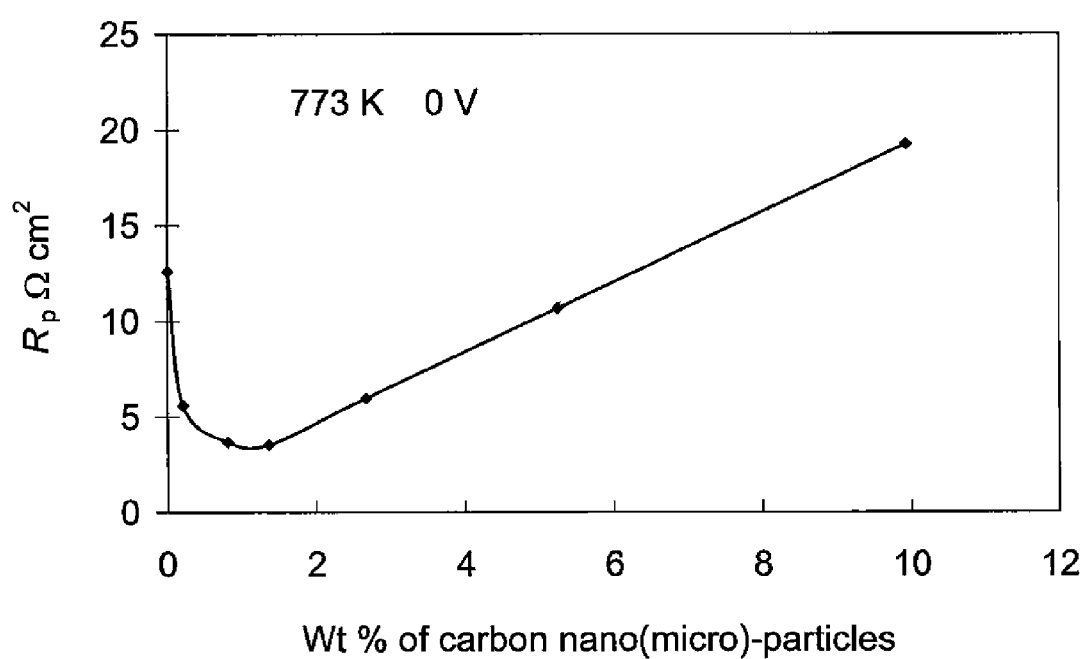
FIGS. 29, 30, 31, 32 and 33 show the total polarization resistance vs. carbon acetylene black powder wt % plots calculated from impedance plane plots for nano(micro)mesoporous $La_{0.6}Sr_{0.4}CoO_{3-\delta}$ cathode electrode|$Ce_{0.9}Gd_{0.1}O_{1.95}$|porous Pt anode electrode single cell at different cathode electrode potentials and temperatures, noted in figures.
Figure 30:
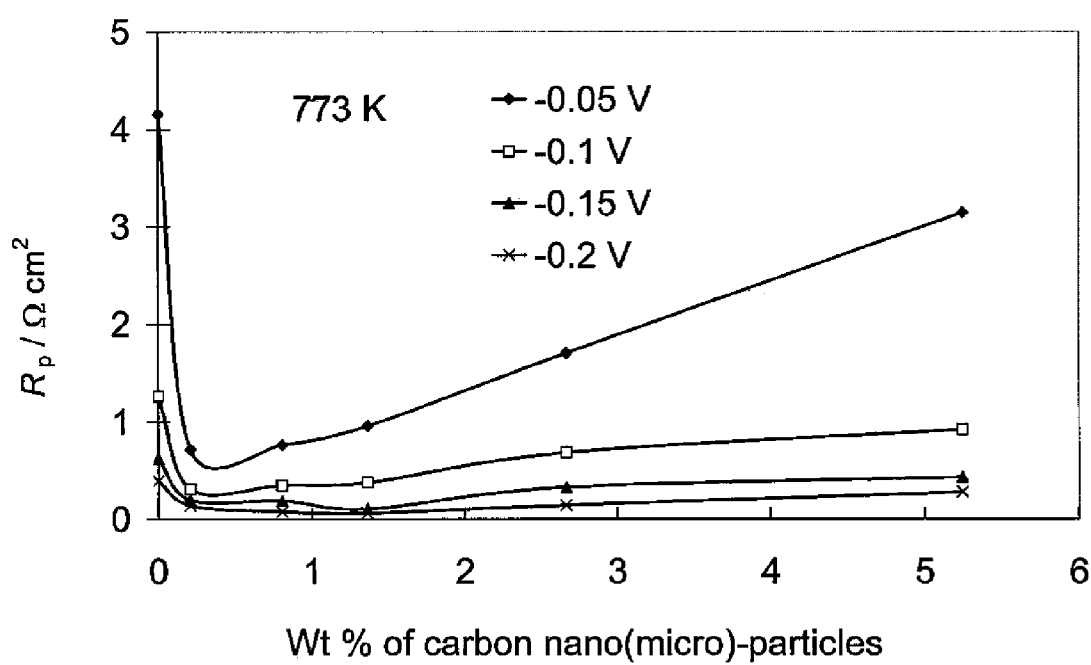
Figure 31:
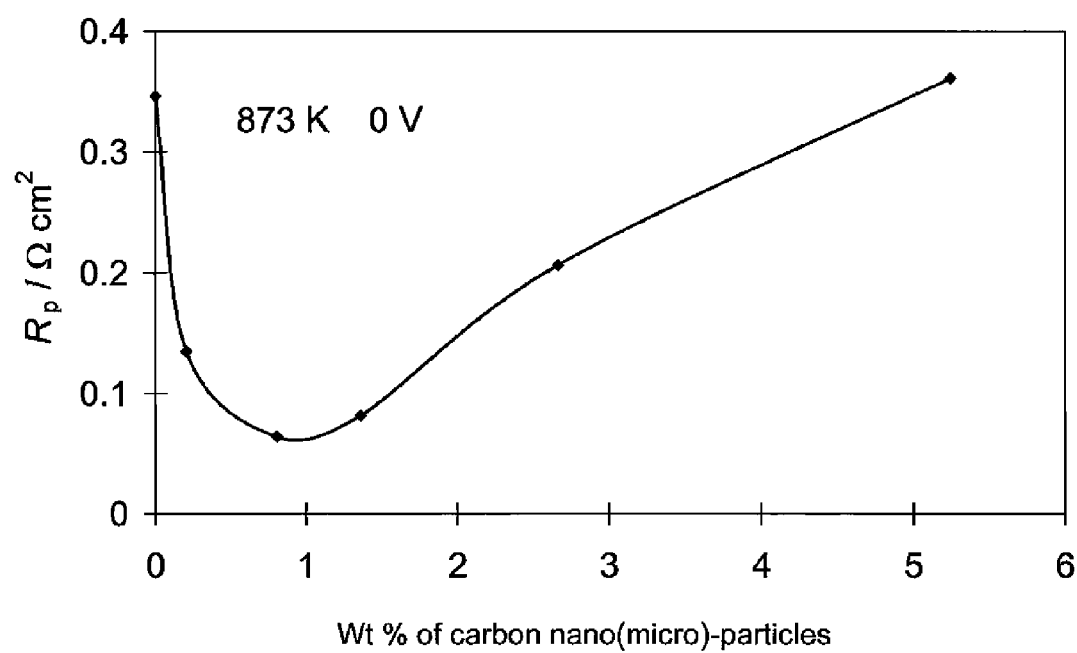
Figure 32:
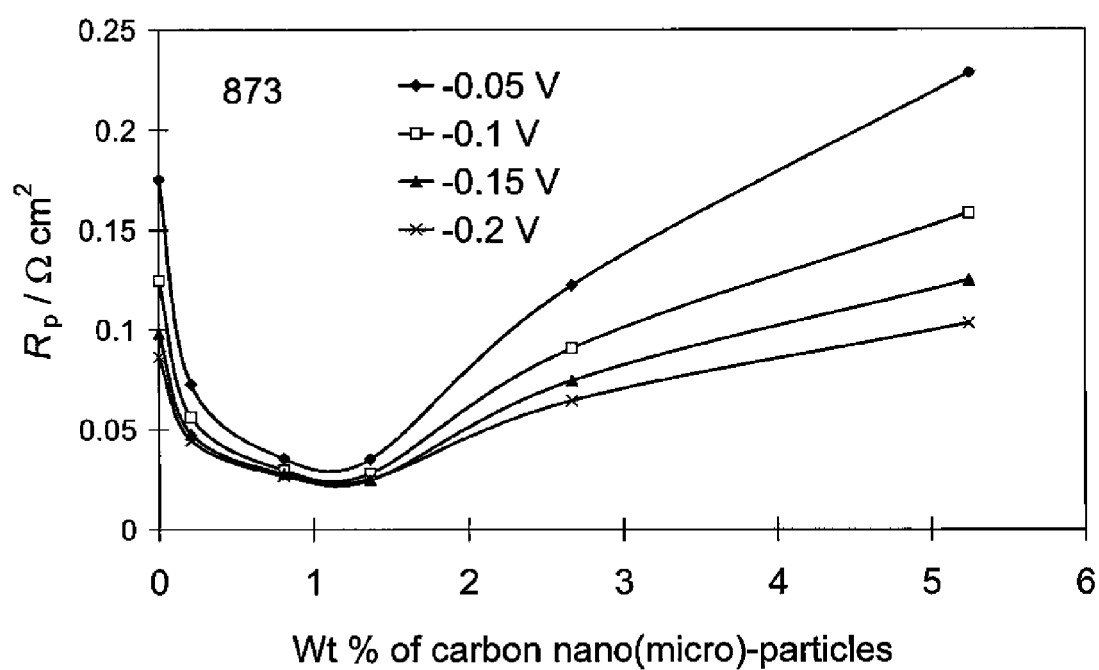
Figure 33:
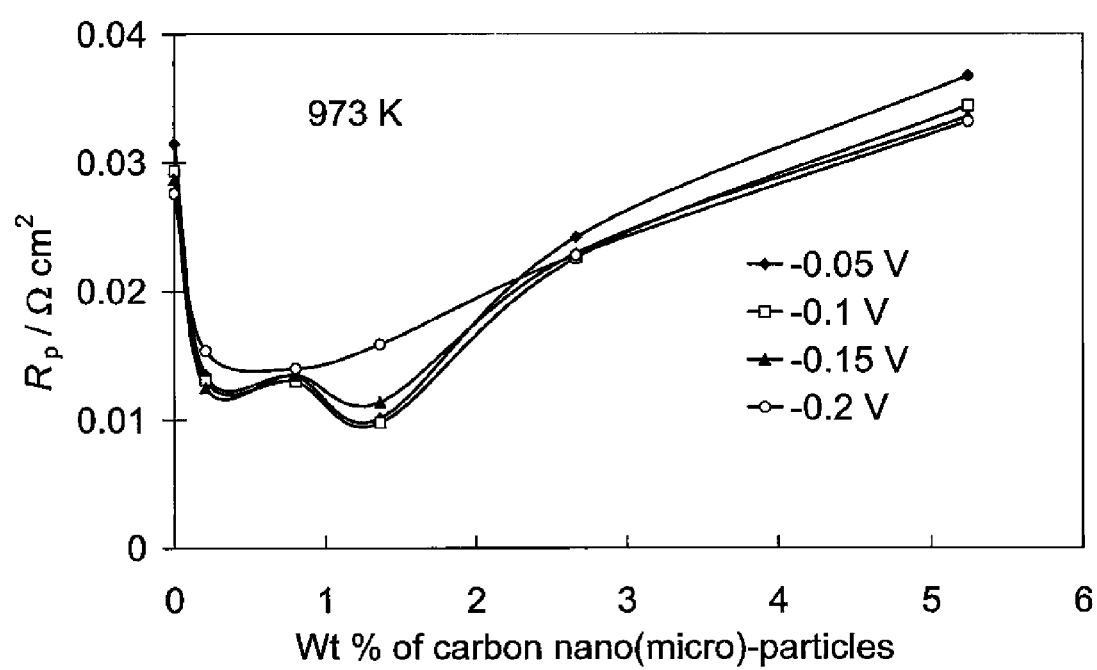

The another (i.e. free) side of $Gd_{1-x}Sr_xCoO_{3-\delta}$ electrolyte was covered by Pt-paste, using screenprinting method and thereafter was sintered at temperature from 800 to 1473 K to form the porous Pt-electrode with very large surface area. The cyclic voltammetry data (FIGS. 20-22), electrochemical impedance (FIGS. 23-28) and chronoamperometry methods were used for characterisation of oxygen reduction kinetics at nano(micro)meso-porous rare earth cobaltite activated with $Sr^{2+}$ ions cathode electrode prepared by method discussed before. The very high current densities (FIGS. 20-22), and very low total polarization resistances (FIGS. 23-33) at working temperatures from 723 to 773 K show that the unexpectedly highly effective cathode electrodes were prepared, characterized with surprisingly low activation energy values. The obtained cathodes are having very large surface area from 10-500 $m^2 g^{-1}$, and characterised by very high catalytic activity and having very low oxygen electroreduction activation energy varying from 0.3-0.8 eV at −0.2 to 0 V cathode electrode potential versus porous $Pt|O_2$ reference electrode in air.

The subject of this invention is a method of fabricating a medium temperature solid oxide fuel cell cathode electrode comprising the steps of forming a mixture of $La_{1-x}Sr_xCoO_{3-\delta}$, $Pr_{1-x}Sr_xCoO_{3-\delta}$ or $Gd_{1-x}Sr_xCoO_{3-\delta}$ particles and carbon acetylene black powder (pore forming agent) into a green or unsintered cathode structure typically with organic binders and plasticizers, heating the green cathode structure in air to a suitable sintering temperature, forming a sintered cathode electrode structure during heating at temperature from 700 to 1500 K and by the thermal decomposition of organic binders at temperature from 700 to 1600 K and following the oxidation of carbon acetylene black powder to $CO_2$ in the temperature range from about 700 to about 1600 K forming a highly nano(micro)meso-porous cathode electrode catalytically highly active and stable within the temperature range from 723 to 973 K.

Figure 1:
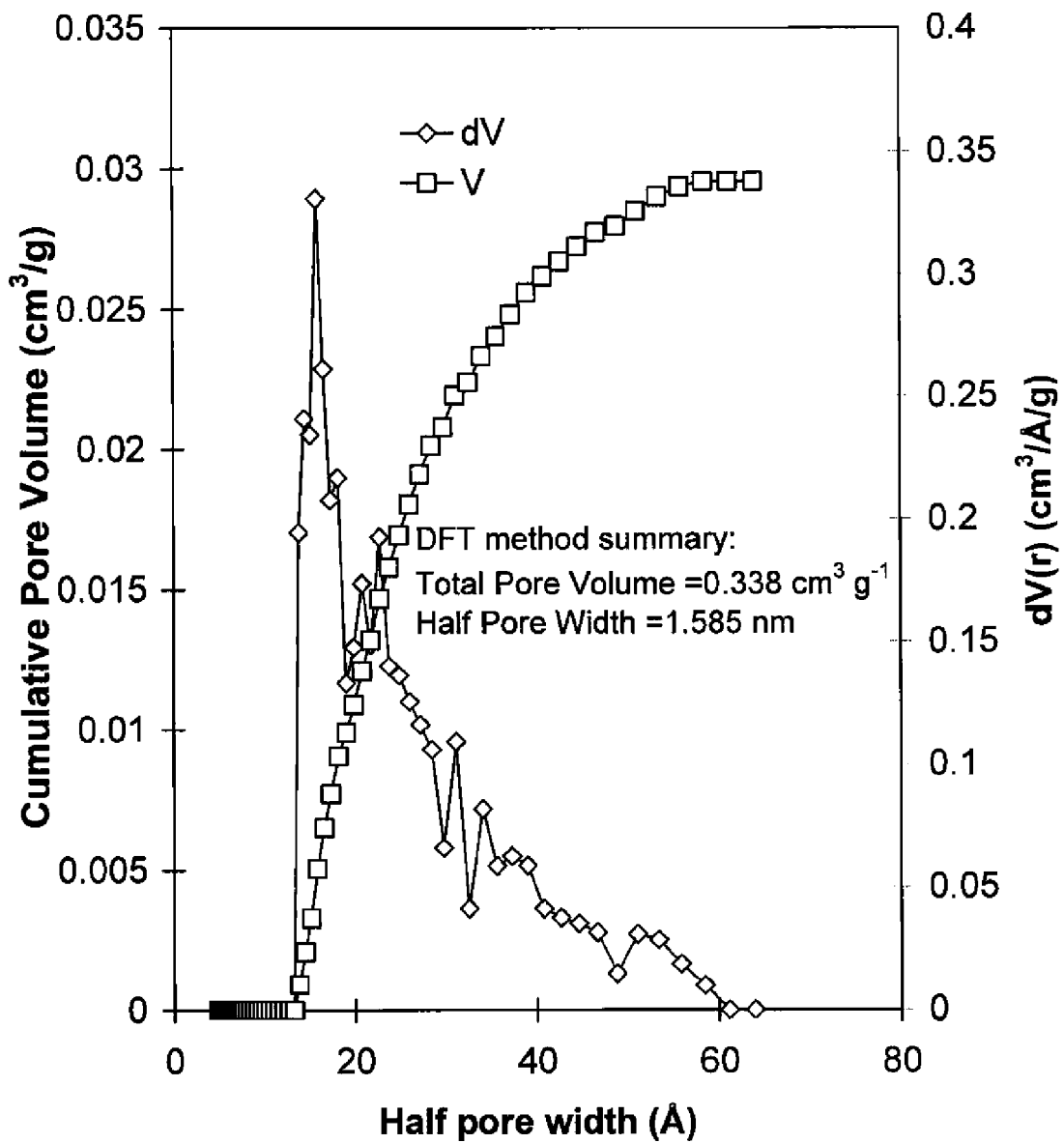
FIGS. 1, 2, 3 and 4 show the gas adsorption measurement data for nano(micro)meso-porous rare earth cobaltite powders, activated with strontium ions, based on Brunauer-Emmett-Teller (BET) gas adsorption measurement method and calculated using density functional theory (DFT) (FIGS. 1 and 3) and Barret-Joyner-Hallenda model (FIGS. 2 and 4) explaining the pore size distribution, medium pore diameter, total pore volume and surface area, given in figures. The data in FIGS. 1 and 2 correspond to $Pr_{0.6}Sr_{0.4}CoO_{3-\delta}$ and in FIGS. 3 and 4 to $Gd_{0.6}Sr_{0.4}CoO_{3-\delta}$. The corresponding rare earth cobaltites activated with Sr$^{2+}$ ions have been prepared by the thermal decombination method from $La(NO_3)_3.6H_2O$, $Sr(NO_3)_2$ and $Co(NO_3)_3.6H_2O$ and glycine mixture at temperatures from 373 to 1173 K.
Figure 2:
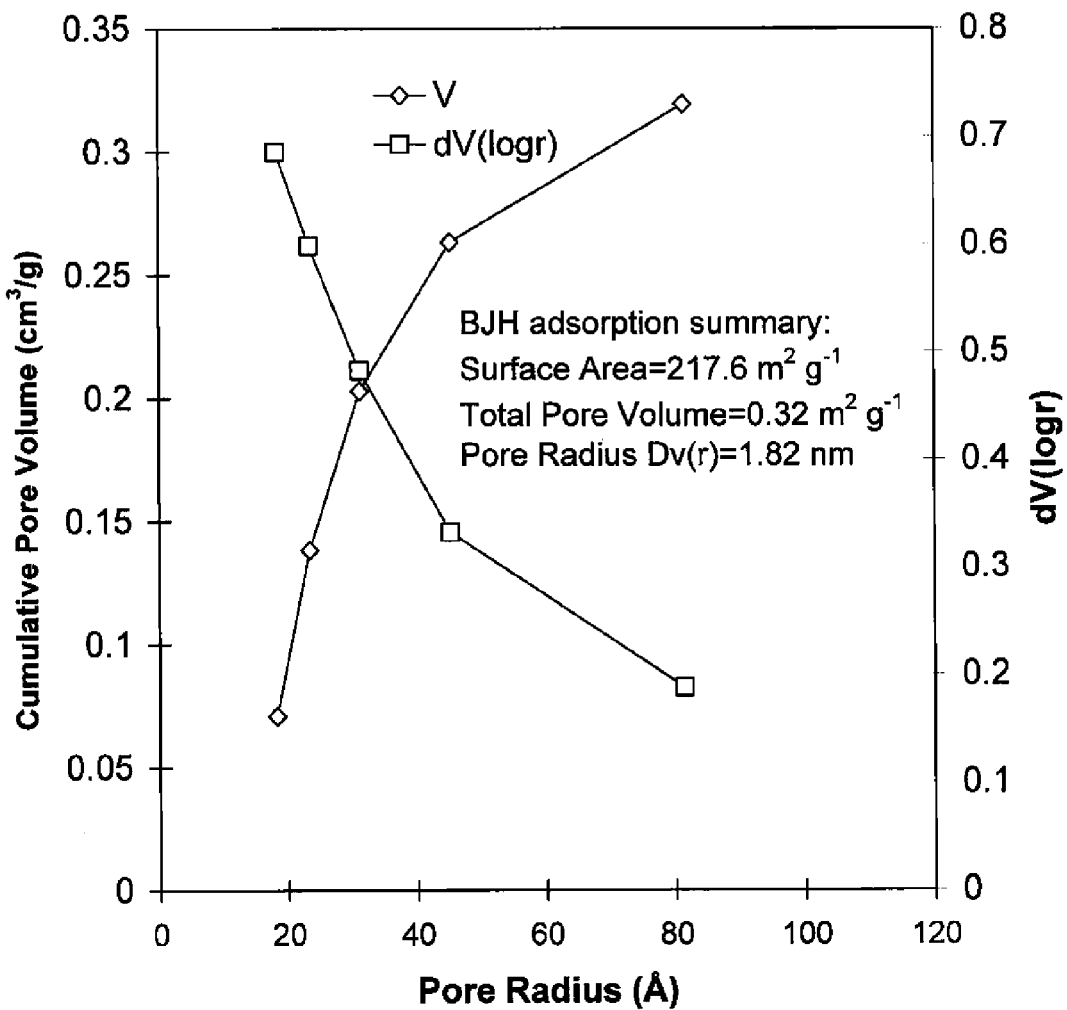
Figure 3:
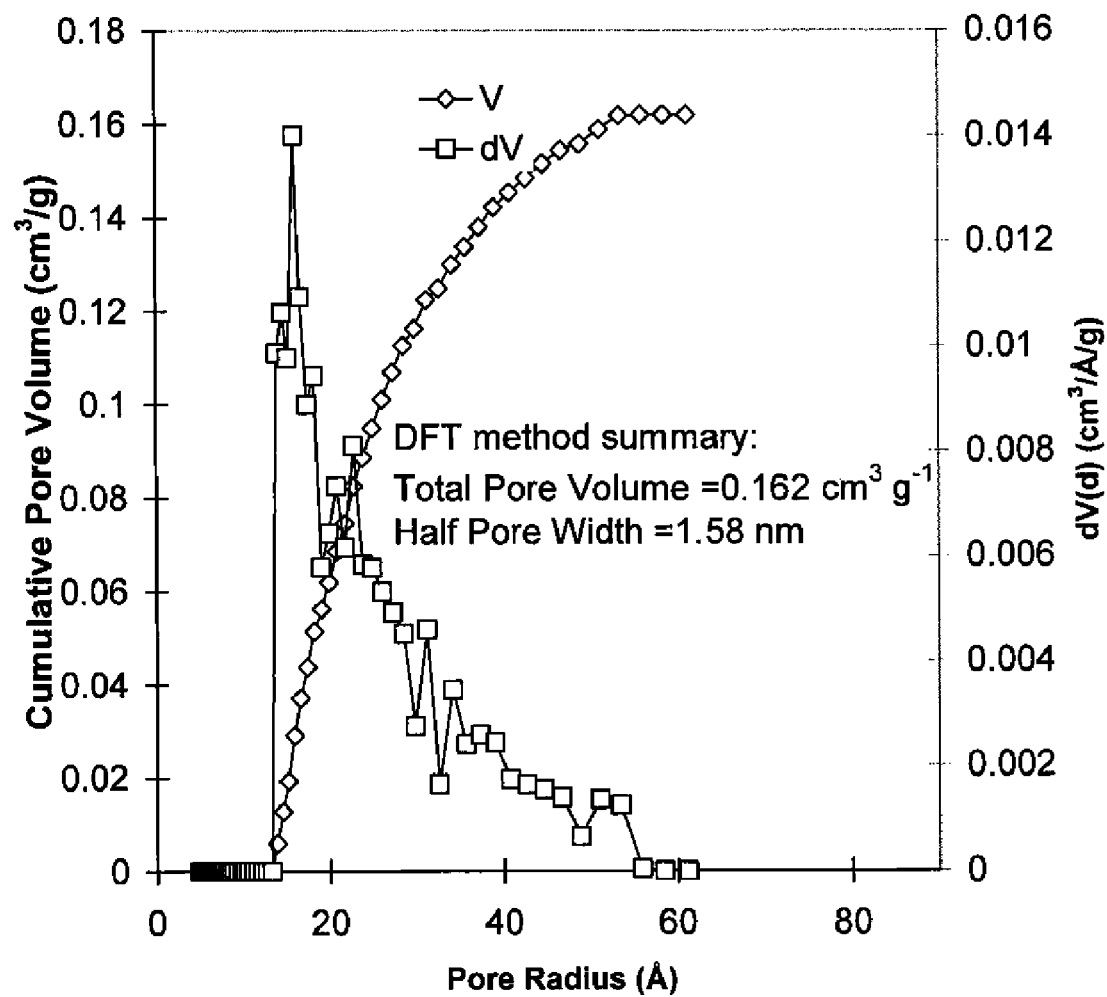
Figure 4:
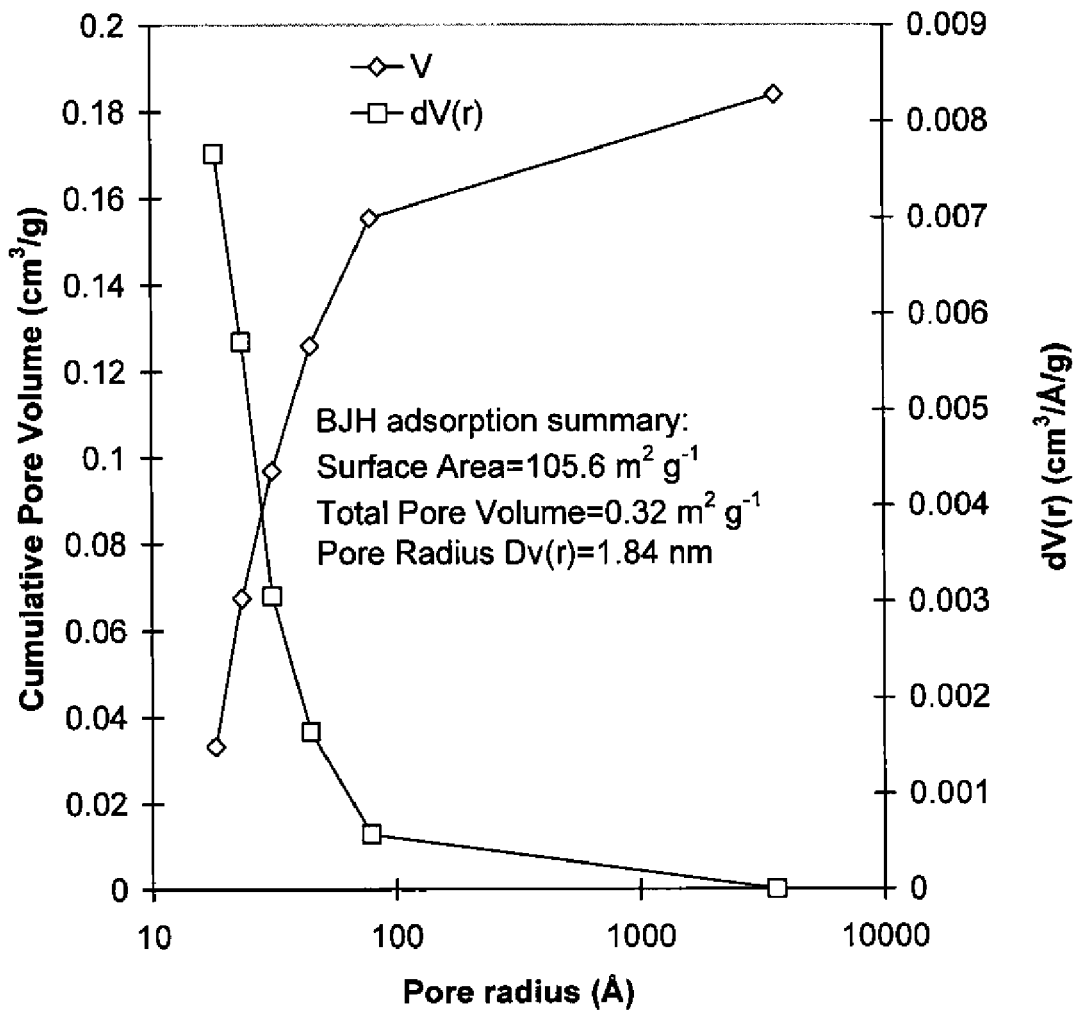
Figure 5:
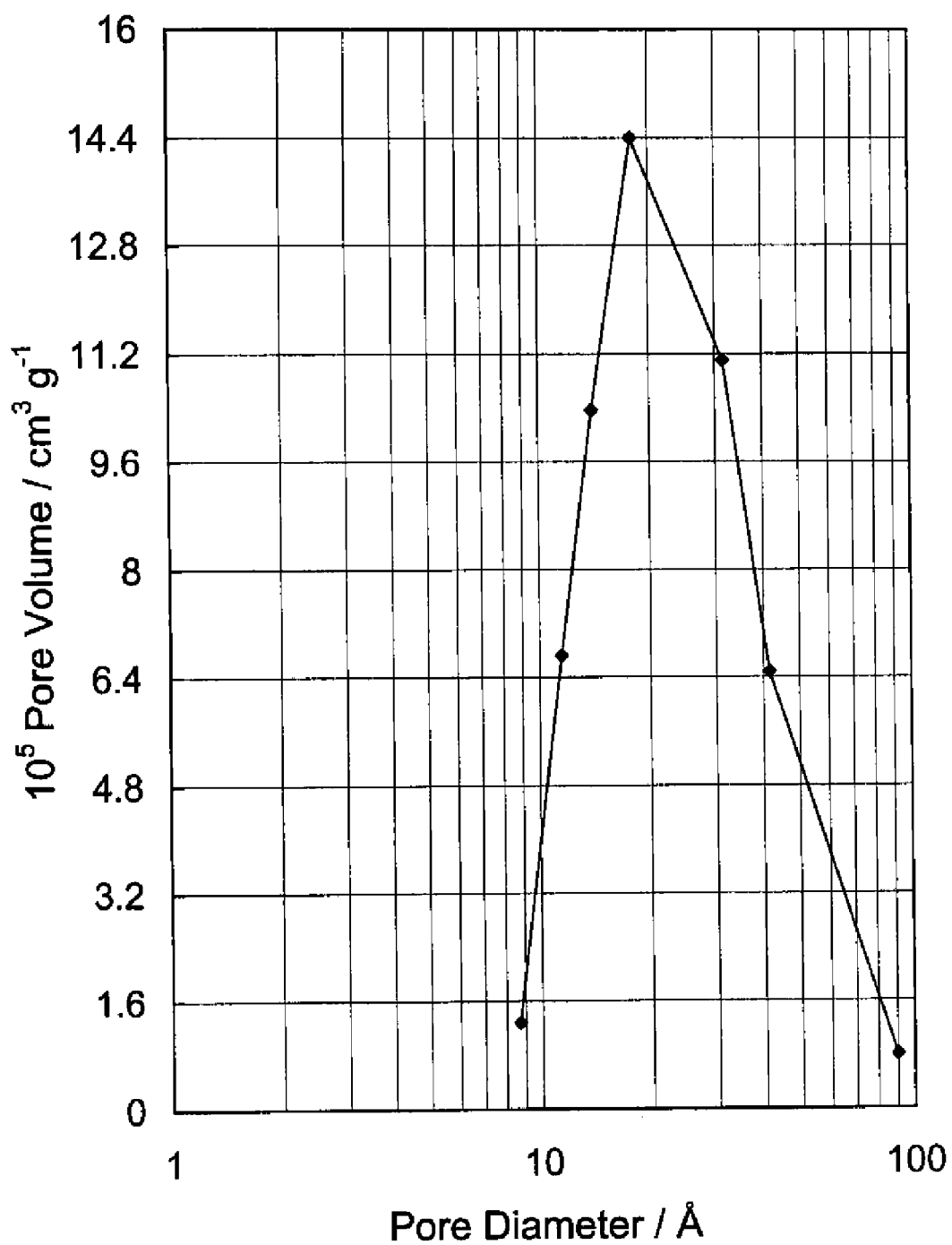
FIGS. 5 and 6 show the BET data for nano(micro)mesoporous $La_{0.6}Sr_{0.4}CoO_{3-\delta}$ cathode electrode sintered at $Ce_{0.9}Gd_{0.1}O_{1.95}$ electrolyte at 1423 K during 5 hours.
Figure 6:
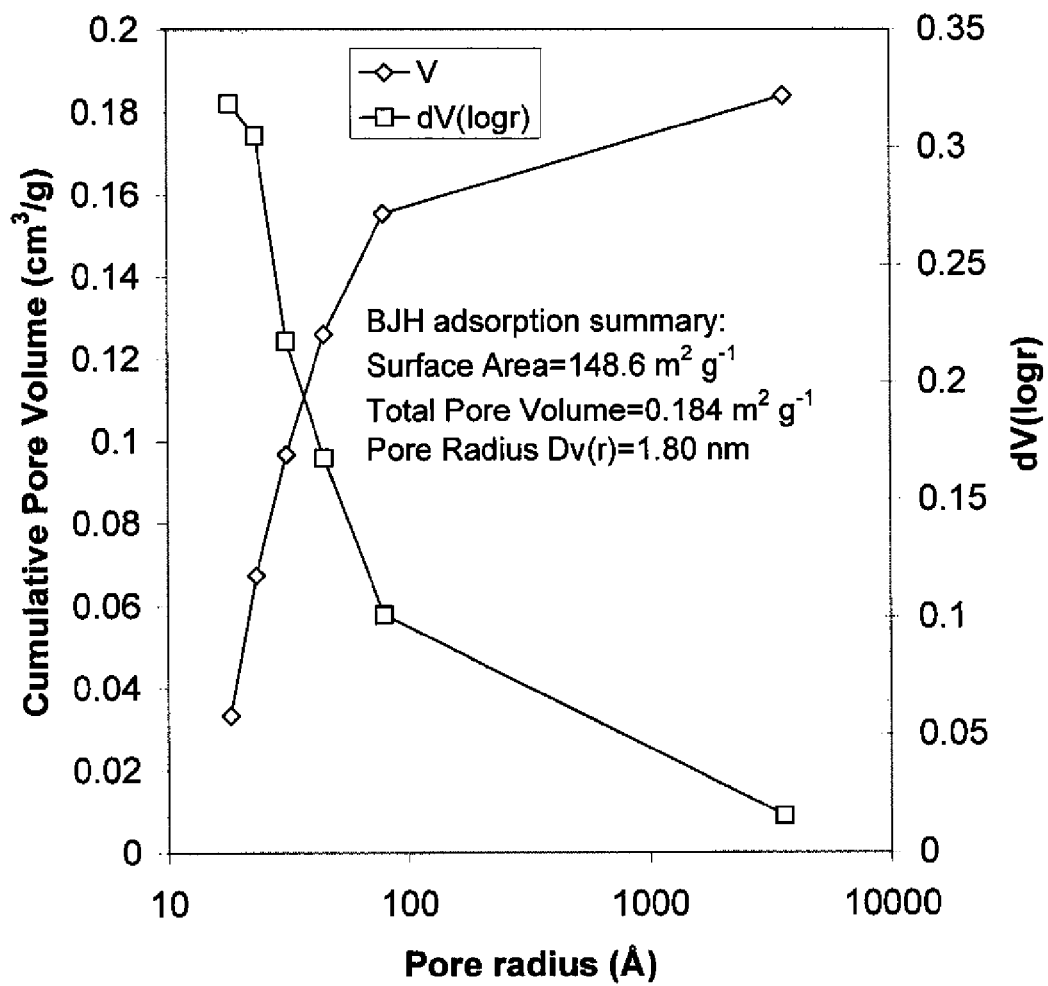
Figure 7:
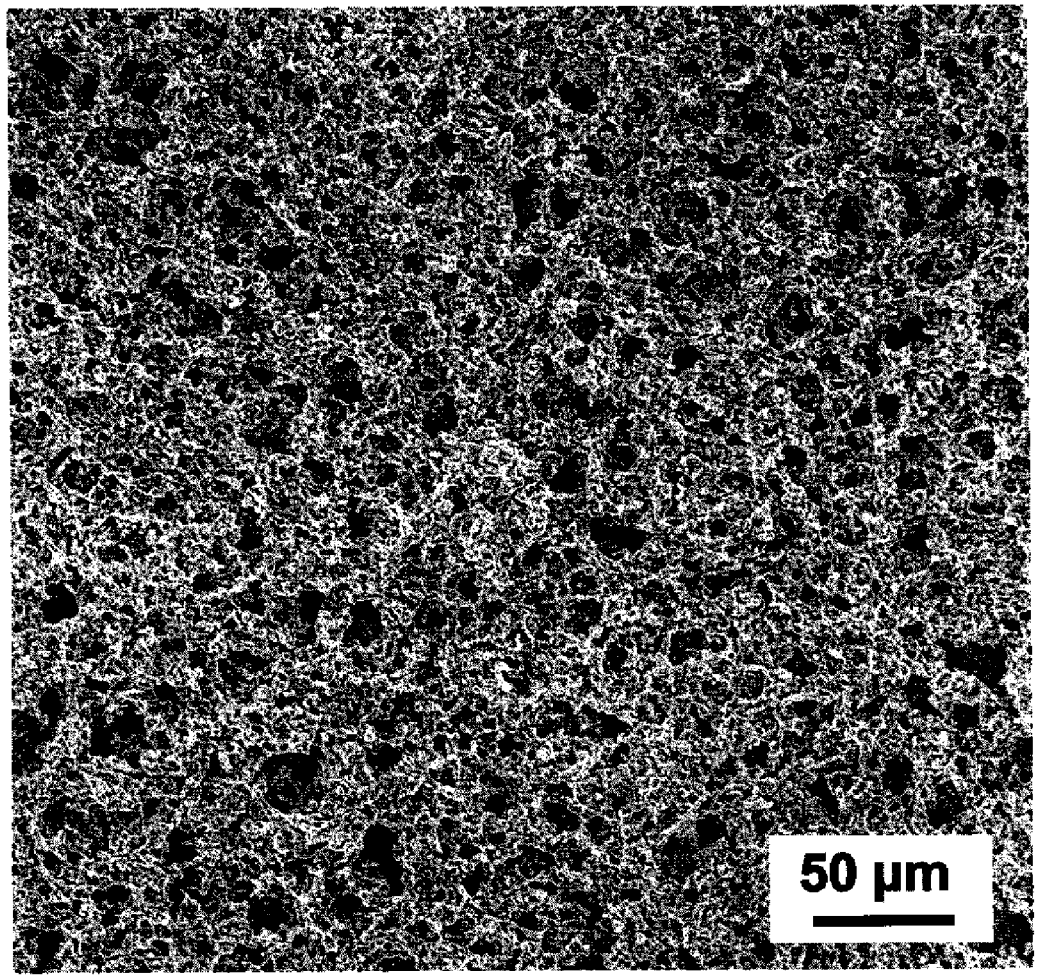
FIGS. 7, 8, 9, and 10 show the backscattered electron SEM (scanning electron microscopy) images for nano(micro)meso-porous $La_{0.6}Sr_{0.4}CoO_{3-\delta}$ and $Pr_{0.6}Sr_{0.4}CoO_{3-\delta}$ and $Gd_{0.6}Sr_{0.4}CoO_{3-\delta}$ electrodes sintered at various temperatures from 973 to 1573 K and additions of carbon acetylene black powder from 0 to 10 wt % in raw cathode paste.
Figure 8:
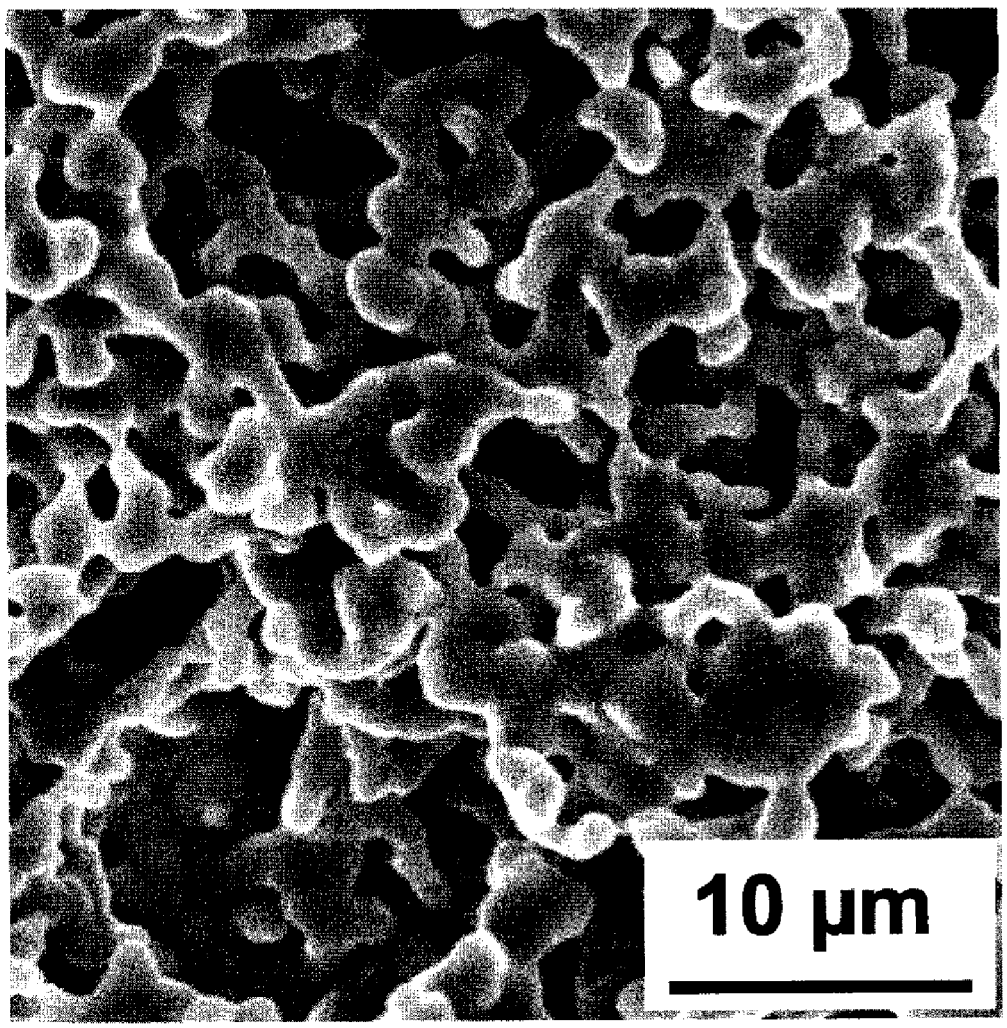
Figure 9:
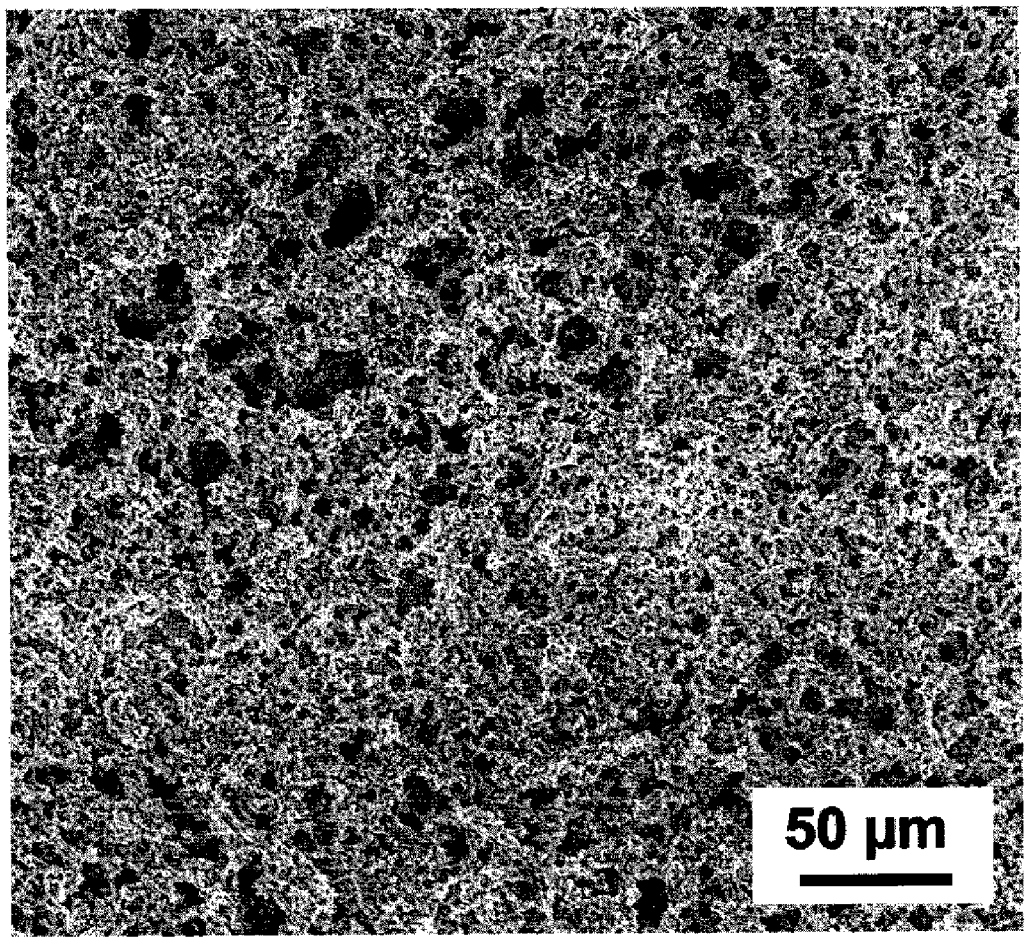
Figure 10:
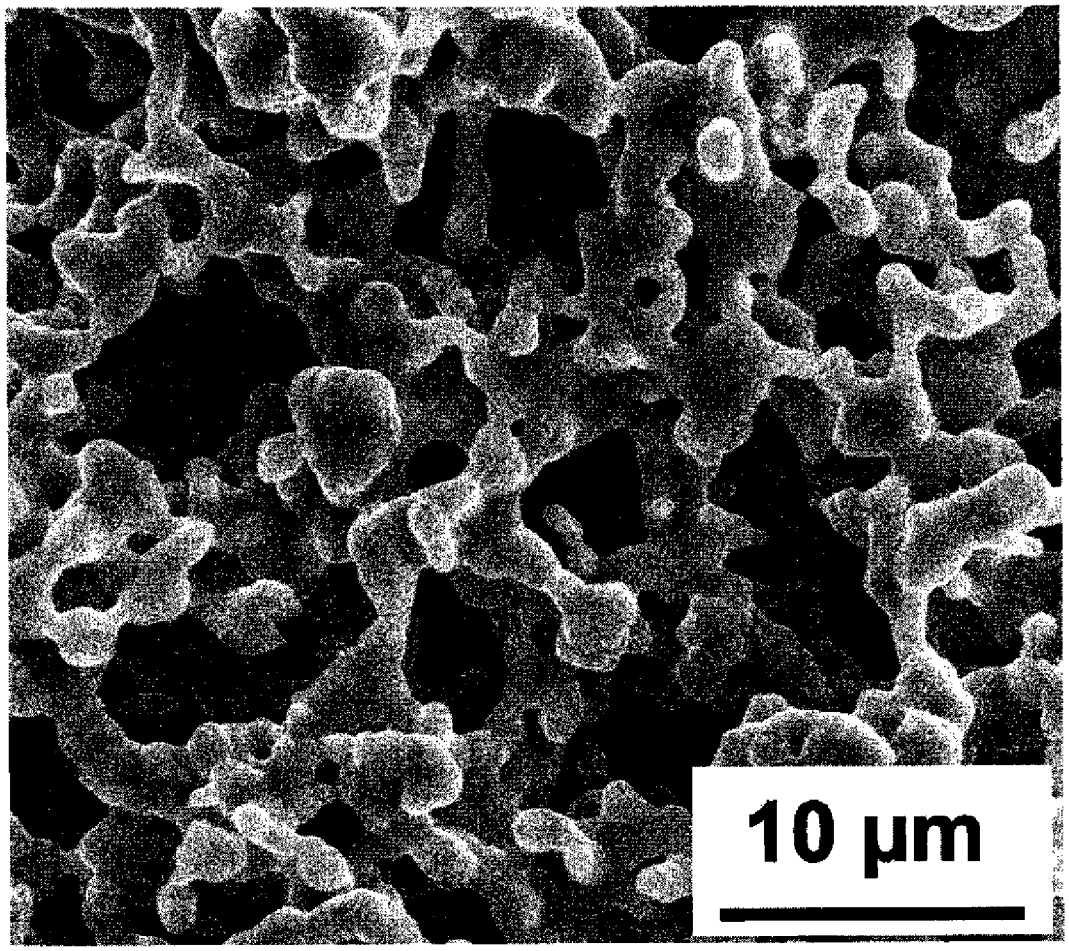

The Brunauer-Emmett-Teller (BET) ($N_2$ gas adsorption measurement at the nitrogen boiling temperature) analysis of nano(micro)mesoporous $La_{0.6}Sr_{0.4}CoO_{3-\delta}$, $Pr_{0.6}Sr_{0.4}CoO_{3-\delta}$, and $Gd_{0.6}Sr_{0.4}CoO_{3-\delta}$ cathode powders (FIGS. 1-6) shows that the materials with very large surface area (from 10 to 500 $m^2 g^{-1}$) can be synthesized by using the solution based nitrate decomposition method. The very narrow pore size distribution with medium pore diameter from 2.0 to 4.0 nm and very large total pore volume (given in FIGS. 1-6) have been obtained. Thus, in addition to the nano(micro) pores there are numerous mesopores inside nano(micro)mesoporous cathode powder (rare earth cobaltite activated with strontium ions), characterised by the very good $O_2$ molecules transport properties to the reaction zone or reaction volume (triple phase boundary area). The data in FIGS. 5 and 6 show that the nano(micro)meso-porous $La_{0.6}Sr_{0.4}CoO_{3-\delta}$ cathode electrode|$Ce_{0.9}Gd_{0.1}O_{1.95}$ electrolyte halfcell has very narrow pore size distribution and large surface area (from 10 to 148 $m^2 g^{-1}$).

FIGS. 7-10 show back scattered electron (BSE) scanning electron microscopy (SEM) images of nano(micro)mesoporous cathode electrode of the solid oxide fuel cell single cell after sintering and thermal decomposition of pore forming agents, binder and solvent at different amounts of pore forming agents, added to nano(micro)particle $La_{0.6}Sr_{0.4}CoO_{3-\delta}$ powder. As can be seen from these figures (FIGS. 7-10) the very nice porous microstructure of the cathode has been formed. The SEM data in FIGS. 7-10 show that the very mesoporous $La_{0.6}Sr_{0.4}CoO_{3-\delta}$ cathode electrode were performed and the mesoporosity depends strongly on the amount of pore forming agent in the raw cathode material prepared as discussed hereinabove. The data in FIGS. 7 and 8 correspond to 1.36 wt %, FIG. 9 to 2.66 wt % and FIG. 10 to 5.24 wt % carbon acetylene black powder addition into the raw cathode paste.

Figure 11:
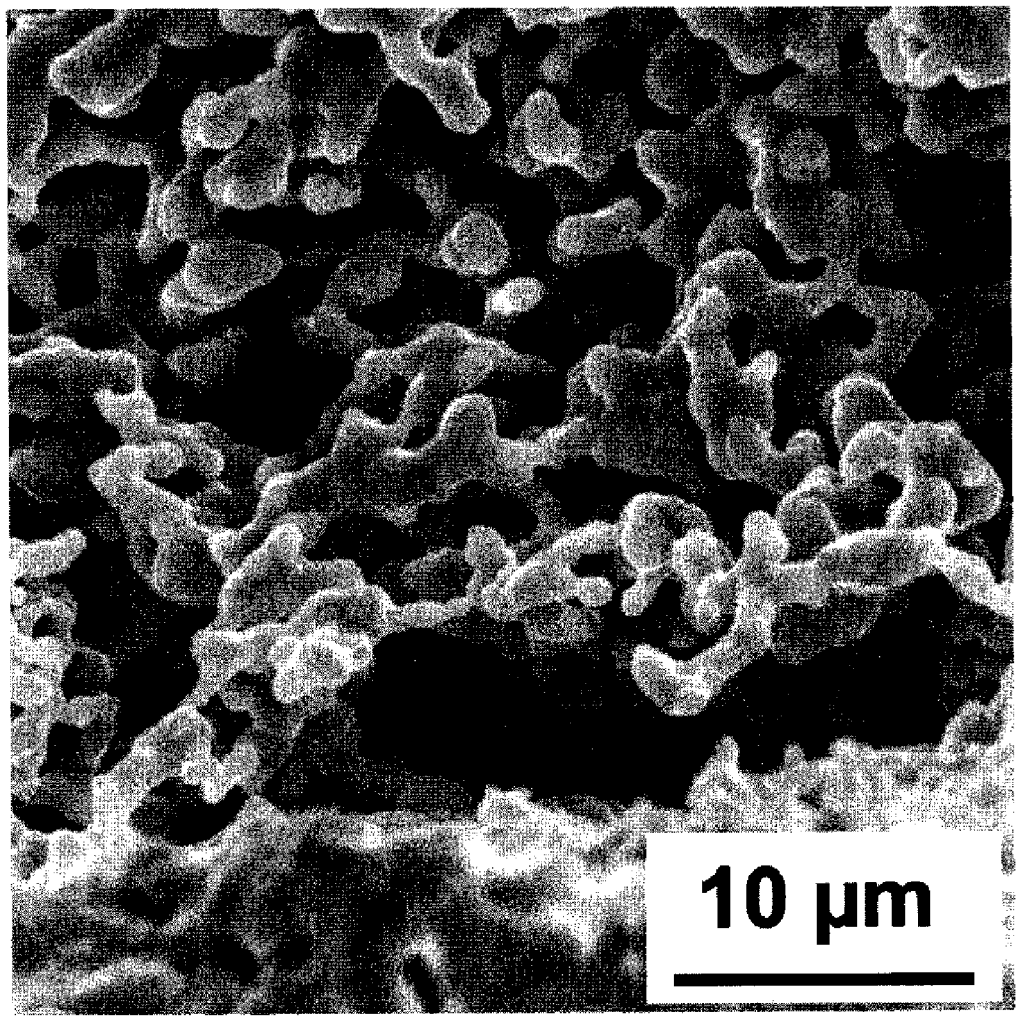
FIGS. 11 and 12 show the SEM data for the phase boundary region between $Ce_{0.9}Gd_{0.1}O_{1.95}$ electrolyte and nano(micro)mesoporous $La_{0.6}Sr_{0.4}CoO_{3-\delta}$ cathode electrode prepared by addition of 9.93 wt % carbon acetylene black powder into the raw cathode paste and burned out at 1427 K during 8 hours.
Figure 12:
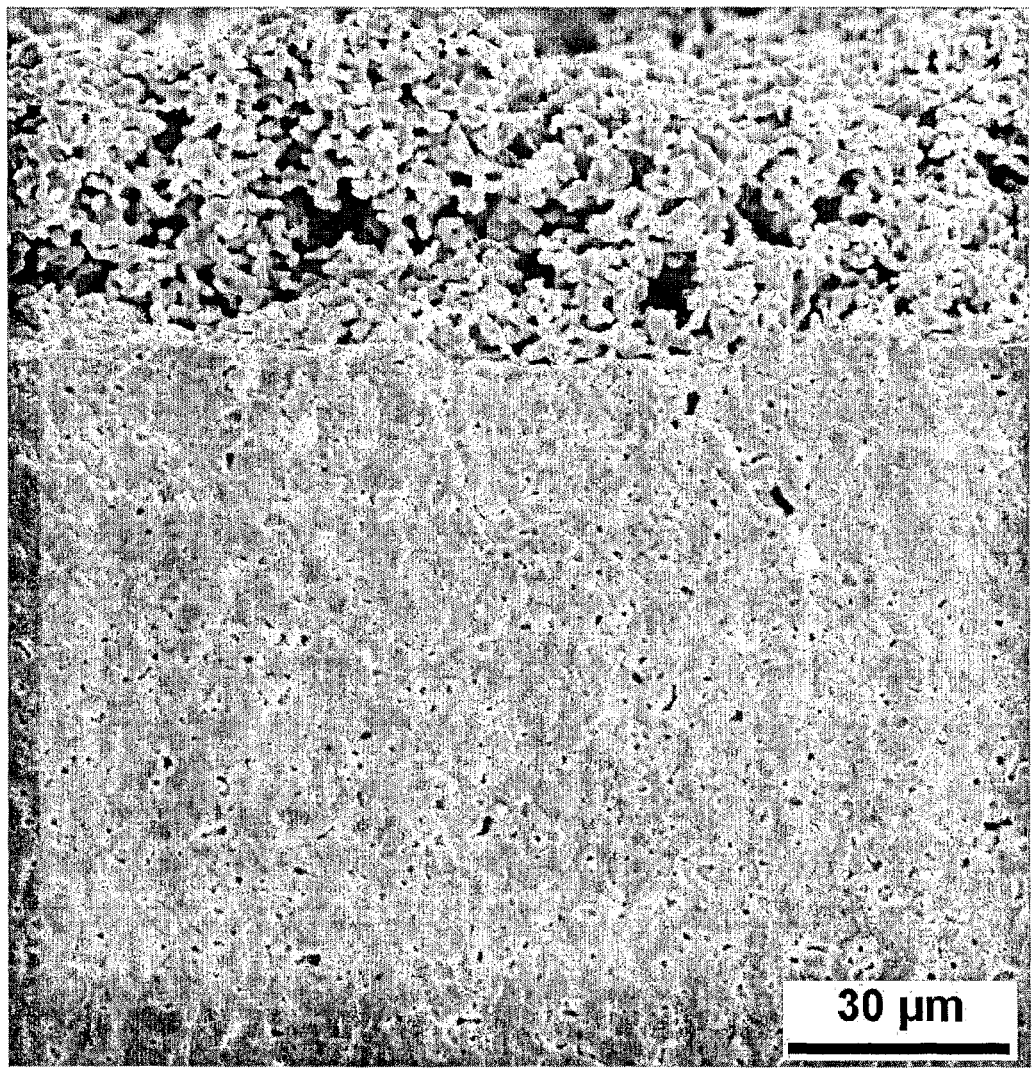
Figure 13:
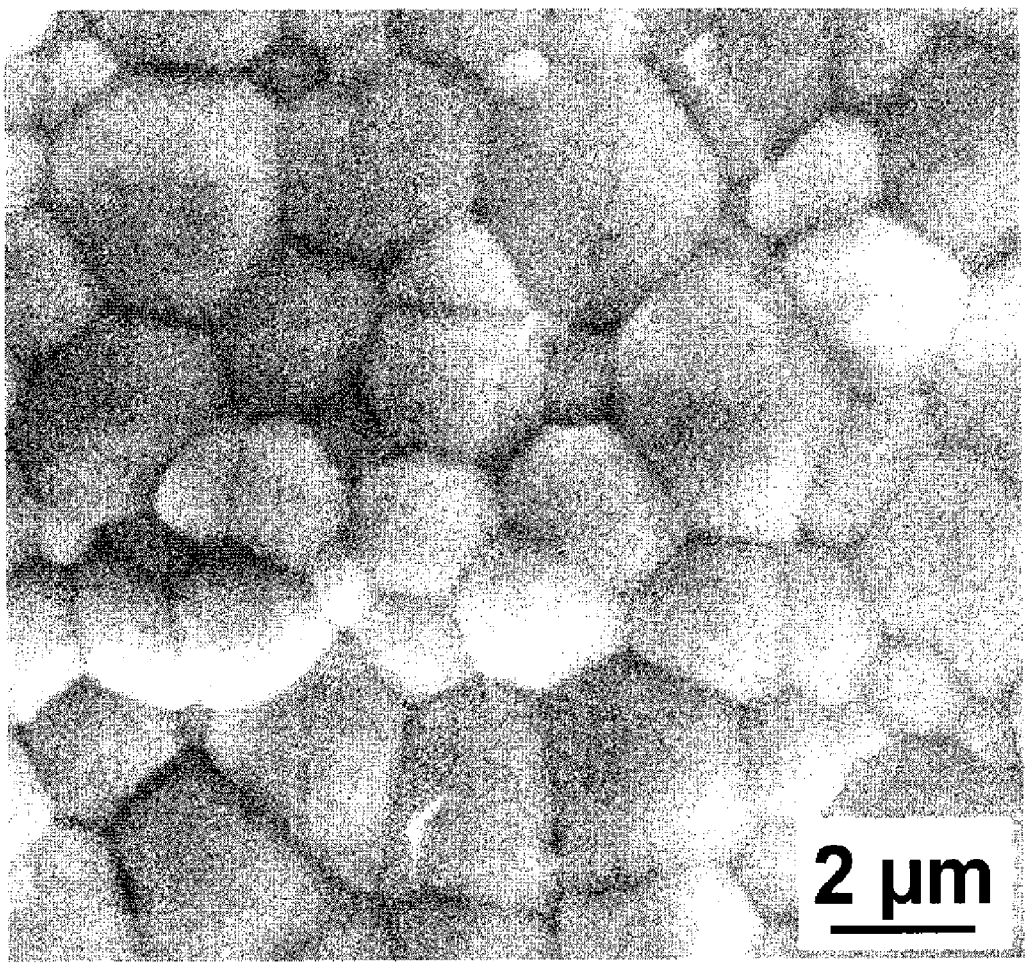
FIG. 13 demonstrates the SEM data for electrolyte surface sintered at 1773 K during 8 hours.

FIGS. 11 and 12 show the nano(micro)mesoporous cathode electrode|$Ce_{0.9}Gd_{0.1}O_{1.95}$ electrolyte interface, and it is very well visible that cathode is mesoporous and the SEM data in FIGS. 11, 12 and 13 show that there are no pores inside the $Ce_{0.9}Gd_{0.1}O_{1.95}$ electrolyte prepared from $Ce_{0.9}Gd_{0.1}O_{1.95}$ nanopowder and sintered at T=1773 K during 300 min. As obtained herein, the amount of carbon acetylene black powder has very high effect on the sintered $La_{0.6}Sr_{0.4}CoO_{3-\delta}$ nano(micro)mesoporous structure.

Figure 14:
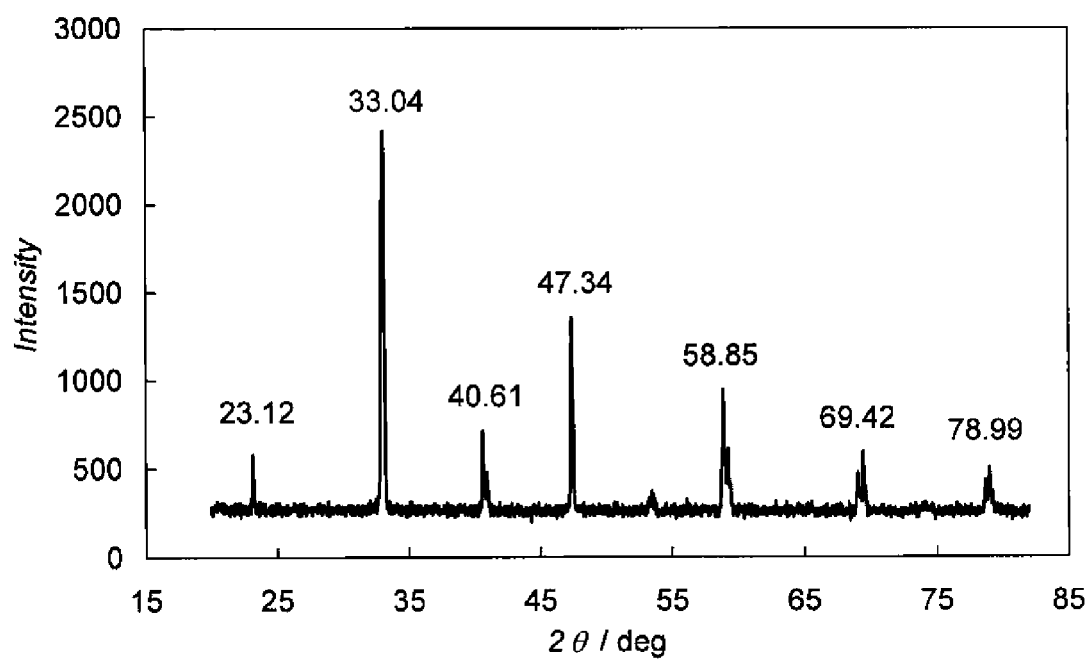
FIGS. 14, 15, 16 and 17 show the X-ray diffraction data for nano(micro)mesoporous cathode electrode (rare earth cobaltite activated with Sr$^{2+}$ ions) sintered at different chemical compositions.
Figure 15:
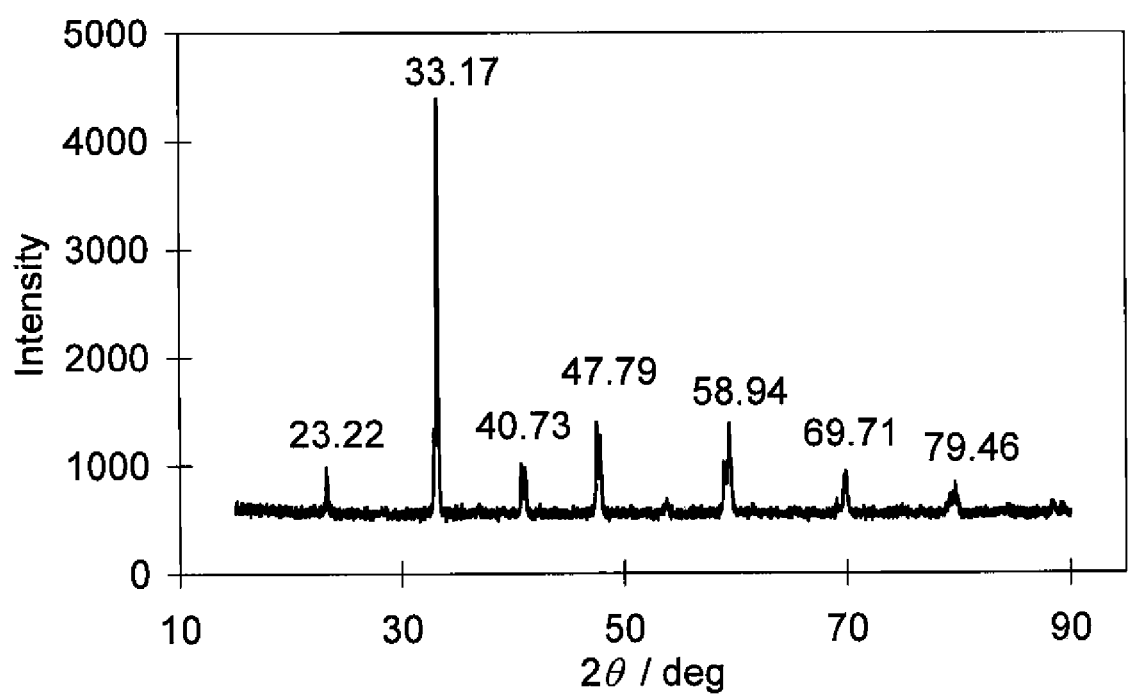
Figure 16:
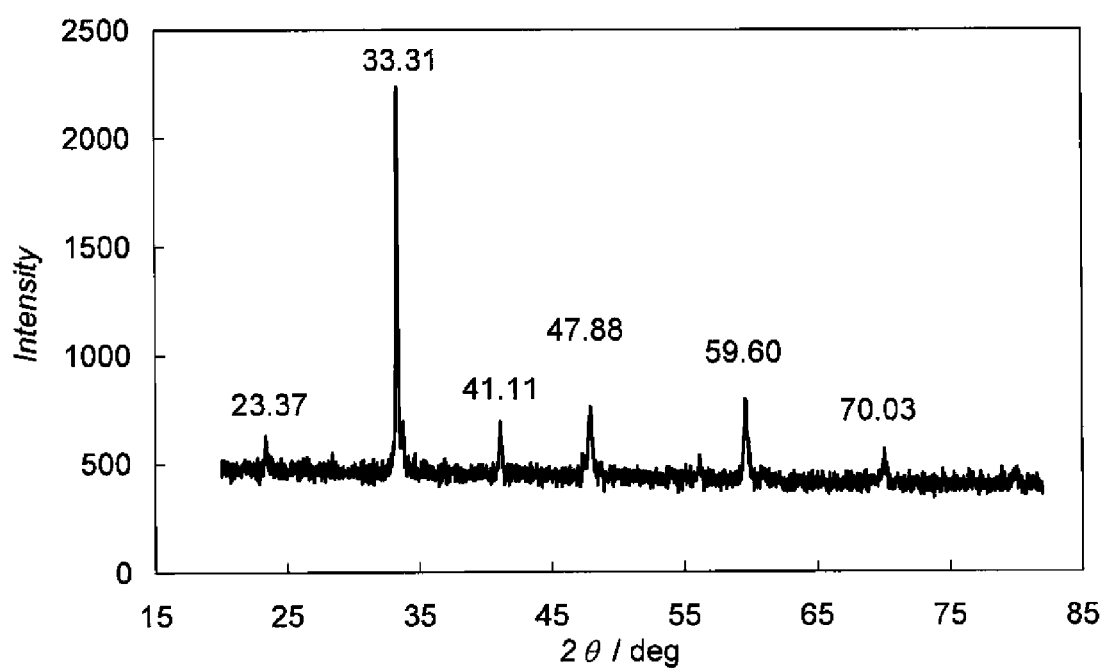
Figure 17:
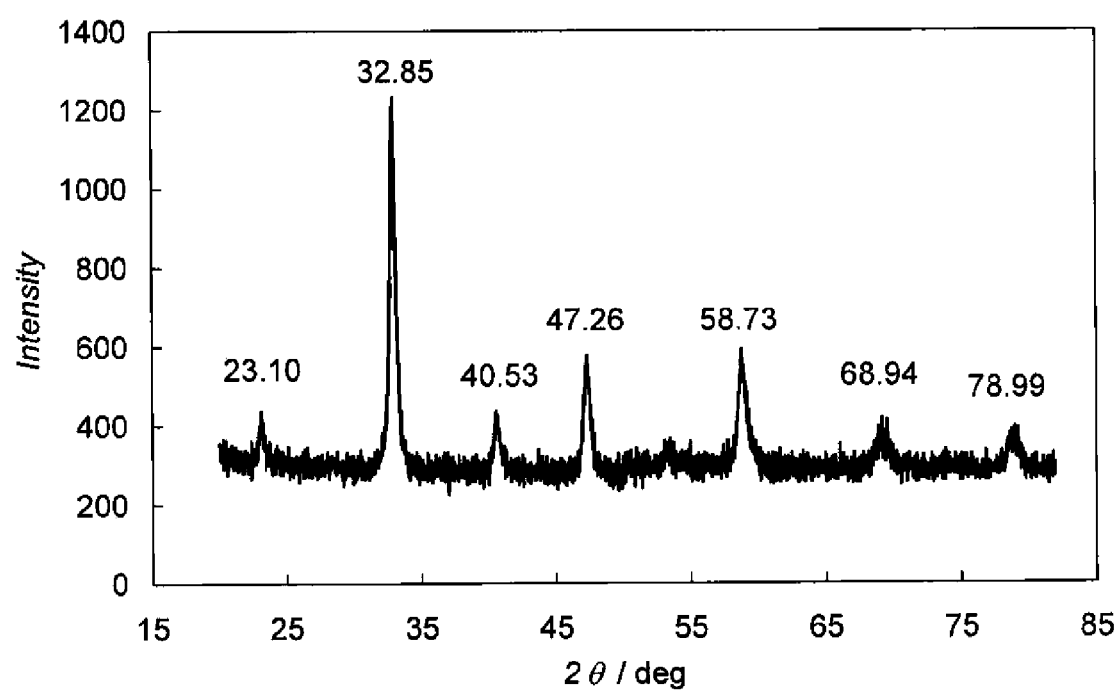
Figure 34:
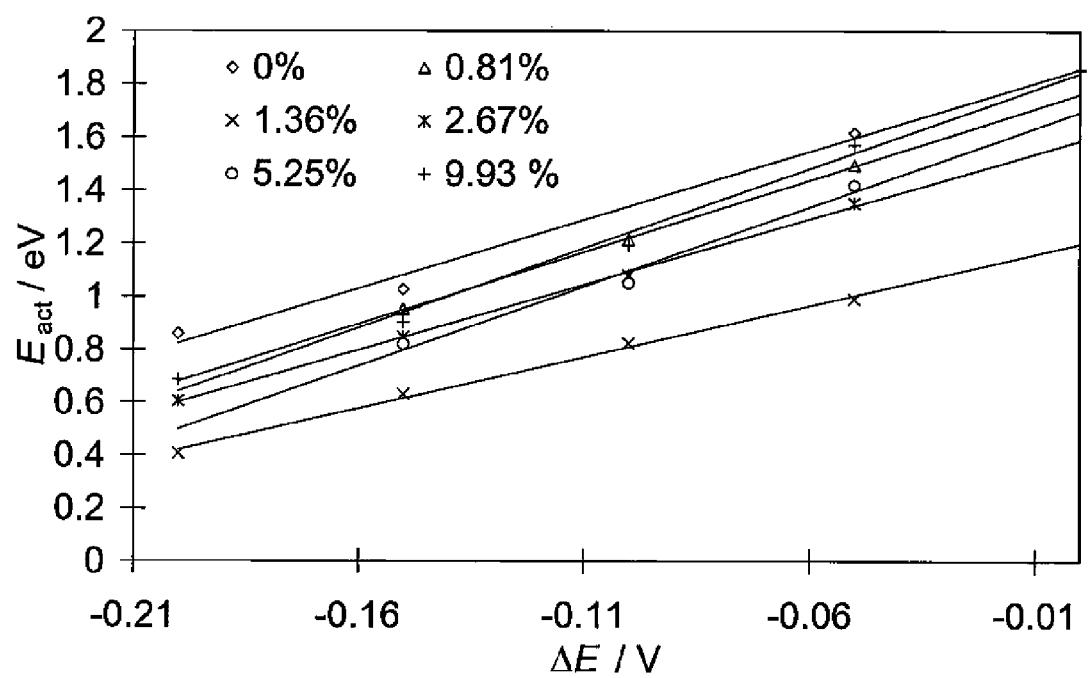
FIG. 34 shows activation energy vs. cathode electrode potential plots for nano(micro)mesoporous $La_{0.6}Sr_{0.4}CoO_{3-\delta}$ cathode electrode|$Ce_{0.9}Gd_{0.1}O_{1.95}$|porous Pt anode electrode single cell, calculated from the impedance data in the case of various additions of carbon acetylene black powder into the raw cathode material, shown in figure.

The X-ray diffraction data (FIGS. 14, 15, 16 and 17) for the nano(micro)mesoporous cathode electrode (rare earth cobaltite activated with $Sr^{2+}$ ions) as prepared sintered onto gadolinia stabilized ceria electrolyte at T=1427 K, show a good crystallinity according to the trigonal R-3c perovskite-type structure for $La_{0.6}Sr_{0.4}CoO_{3-\delta}$ (FIG. 14), $Pr_{0.6}Sr_{0.4}CoO_{3-\delta}$ (FIG. 15) and $Gd_{0.6}Sr_{0.4}CoO_{3-\delta}$ (FIG. 16) in the case of sintering temperatures from 1173 to 1473 K during hours at least. For $La_{0.6}Sr_{0.4}CoO_{3-\delta}$ (FIG. 17), $Pr_{0.6}Sr_{0.4}CoO_{3-\delta}$ and $Gd_{0.6}Sr_{0.4}CoO_{3-\delta}$ cathode electrodes as prepared, sintered at temperature lower than 1073 K during from two to five hours, the crystallinity is not so good as for $La_{0.6}Sr_{0.4}CoO_{3-\delta}$, sintered at T>1173 K during five hours. The cyclic voltammetry data (FIGS. 20-22) and impedance data (FIGS. 23-28) show that only the nano(micro)mesoporous cathode electrodes having good crystallinity can be used the nano(micro)mesoporous cathode electrode|$Ce_{0.9}Gd_{0.1}O_{1.95}$|porous Pt anode single cells, characterised by low oxygen electroreduction activation energy (FIG. 34).

Figure 18:
FIGS. 18 and 19 show the ATM image and surface height profile of $La_{0.6}Sr_{0.4}CoO_{3-\delta}$ cathode electrode structure sintered onto the $Ce_{0.9}Gd_{0.1}O_{1.95}$ electrolyte at temperature 1423 K.
Figure 19:
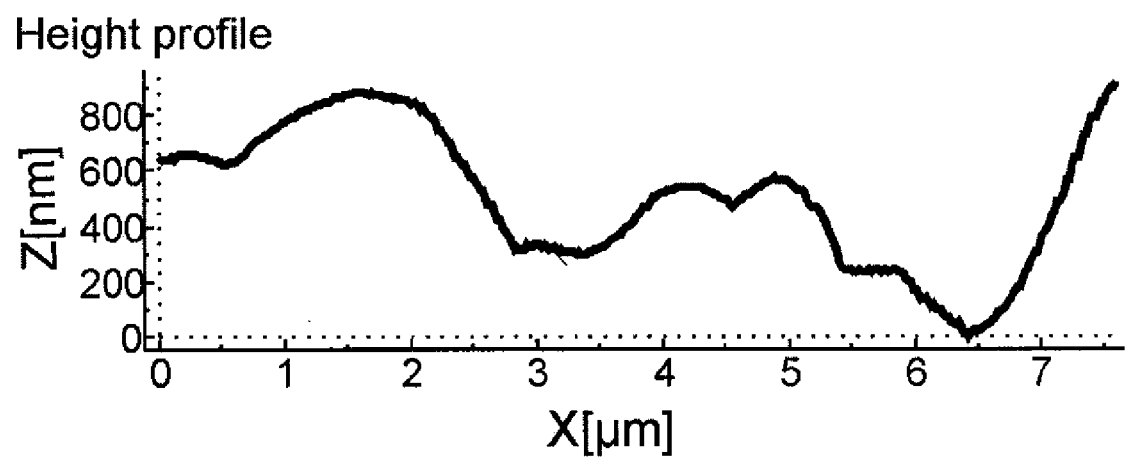

The atomic force microscopy (AFM) data given in FIGS. 18 and 19 show that the very rough cathode surface has been formed and the bigger microscopic crystallites from 2 to 5 μm consist of the nano(micro)particles from 2 to 10 nm. The sintering temperature has very high effect on the nano(micro)mesoscopic structure of nano(micro)mesoporous $La_{0.6}Sr_{0.4}CoO_{3-\delta}$ cathode electrode for the intermediate temperature solid oxide fuel cell, and at sintering temperature T<1173 K the very amorphous cathode electrode structure has formed.

Surprisingly, the cyclic voltammetry curves (FIGS. 20-22) for the nano (micro) mesoporous $La_{0.6}Sr_{0.4}CoO_{3-\delta}$ cathode electrode|$Ce_{0.9}Gd_{0.1}O_{1.95}$ electrolyte|porous Pt anode single cell show that the very high current density (catalytic activity) has been obtained for the nano(micro)mesoporous $La_{0.6}Sr_{0.4}CoO_{3-\delta}$ cathode electrode, where the carbon acetylene black powder (pore forming agent) in the raw cathode material was from 2.56 to 1.36 wt %. The nano(micro)mesoporous cathode electrodes prepared from raw cathode paste where the wt % of the carbon acetylene black powder was higher than 2.56 or lower than 1.36 wt % did not give so high $O_2$ electroreduction current densities.

The normalized complex impedance plane plots in FIGS. 23-28, where Z' is an active real part of complex resistance and Z" is a so-called capacitive resistance (imaginary part of complex resistance), show that the total polarization resistance $R_p$, obtained as a real impedance (resistance) value at alternative current frequency f=0, surprisingly strongly depends on the amount of pore forming agent (carbon acetylene black powder) in the raw cathode paste, burned out at sintering temperature from 500 to 1573 K. The very low $R_p$ values (FIGS. 29-33) have been obtained at working temperature T=973 K for $La_{0.6}Sr_{0.4}CoO_{3-\delta}$ cathode electrode potential at −0.2 V versus porous Pt|$O_2$ reference electrode.

The amount of electrochemical performance of solid oxide fuel cell cathode electrode, expressed as the total polarisation resistance $R_p$ (FIGS. 29-33) obtained from the impedance spectroscopy analysis (FIGS. 23-28) shows that, in the as prepared (i.e. sintered) $La_{0.6}Sr_{0.4}CoO_{3-\delta}$ cathode electrode activity is maximal ($R_p$ is minimal) for cathodes with intermediate carbon acetylene black powder addition from 1.36 to 2.56 wt % of carbon acetylene black powder in raw cathode material. The very low total polarization resistance values for the as prepared cathode electrode show the very high catalytic activity of the nano(micro)mesoporous $La_{0.6}Sr_{0.4}CoO_{3-\delta}$ cathode electrode at T>773 K.

The data in FIG. 34 show that the Arrhenius activation energy $E_{act}$, calculated for oxygen electroreduction process for nano(micro)mesoporous $La_{0.6}Sr_{0.4}CoO_{3-\delta}$ cathode electrodes|$Ce_{0.9}Gd_{0.1}O_{1.95}$ electrolyte|porous Pt anode single cell, prepared using methods discussed before, has minimal values for nano(micro)mesoporous cathode electrode with the amount of pore forming agent said carbon acetylene black powder from 0.5 to 2.5 wt %. The values of $E_{act}$ decrease with increasing the cathode electropolarisation of the cathode (i.e. cathode electrode potential) in agreement with the data in FIGS. 20-33 for nano(micro)mesoporous cathodes, prepared according to the preparation and sintering method discussed before.

It is believed that the methods and examples shown or described above have been characterized as preferred, various changes and modifications may be made therein without departing from the scope of the invention as disclosed in the above description and in the following claims.

Although the invention is described herein in the context of medium temperature solid oxide fuel cells and cathode electrodes sintered at gadolinia doped ceria electrolyte thereof, it will be appreciated by those skilled in the art that the basic principles of this invention may be advantageously applied to other high-temperature fuel cells employing the mixed conducting cathode electrodes to produce highly nano(micro) meso-porous cathode electrode materials at oxygen ion conducting electrolytes.

The invention claimed is:

1. A method for preparation of a solid oxide fuel cell single cell operational from 723 to 1073 K, said fuel cell including a microporous and mesoporous cathode electrode, comprising the following steps:
    (A) thermal decomposing a mixture of rare earth nitrate, strontium nitrate and cobalt nitrate with conducting corresponding rare earth cobaltite activated with strontium ions in the presence of the reducing agent and oxygen;
    (B) preparing a raw cathode electrode paste by mixing rare earth cobaltite activated with strontium ions, mechanically uncompressible pore forming agent, organic binder and solvent or mixture of solvents as microporous and mesoporous forming agents for obtaining highly microporous and mesoporous cathode electrode;
    (C) preparing gadolinia or samaria doped ceria electrolyte by sintering at a temperature from about 800 to about 1800 K with the molar ratio of gadolinia or samaria in gadolinia or samaria activated ceria varied with $CeO_2$, prior to said sintering, pressing said gadolinia and samaria doped ceria electrolyte at a pressure from about 5 to about 20 kN $cm^{-2}$ from about 0.5 to about 15 min;
    (D) forming said microporous and mesoporous cathode electrode and microporous and mesoporous cathode electrolyte halfcell by burning out the pore forming agent, solvent and binder from the raw cathode electrode paste and sintering said raw cathode electrode paste onto the gadolinia or samaria doped ceria oxide oxygen ion conducting electrolyte at a temperature from about 700 to about 1773 K for about 60 to about 600 min; and
    (E) screenprinting Pt-paste onto a free side of cathode electrolyte halfcell and sintering the fuel cell at temperatures from about 800 to about 1500 K for about 6 to about 600 min.

2. The method of claim 1, wherein said molar ratio of gadolinia or samaria in gadolinia or samaria activated ceria is varied up to about 0.20.

3. The method of claim 1, wherein said rare earth cobaltite cathode electrode for solid oxide fuel cell is substituted and activated with strontium ions, varying the molar ratio of Sr2+ up to about 0.6.

4. The method of claim 1, wherein a carbon acetylene black powder is used as an uncompressible pore forming agent in the raw cathode electrode paste.

5. The method of claim 4, wherein the amount of uncompressible pore forming agent in the raw cathode electrode paste is in a range up to about 30 weight percent of the total raw cathode electrode paste.

6. The method of claim 1, wherein said binder is ethylcellulose and the binder is present in a range up to about 10 weight percent of the total raw cathode electrode paste.

7. The method of claim 1, wherein said microporous and mesoporous cathode electrode possesses the hierarchical nano(micro)mesoporous structure with surface area from about 10 to about 500 m2 $g^{-1}$.

8. The method of claim 1 wherein said reducing agent is glycine, further wherein said reducing agent is used to initiate the thermal decomposing step.

9. The method of claim 1, wherein said solvent is turpentine oil.

10. The method of claim 1, wherein said rare earth cobaltite is present in a perovskite structure, further wherein the molar ratio of rare earth element in strontium activated rare earth cobaltite is varied from about 1.0 to about 0.4 in an A-site position of a perovskite structure of rare earth cobaltite.

* * * * *